United States Patent
He et al.

(10) Patent No.: US 10,560,174 B2
(45) Date of Patent: Feb. 11, 2020

(54) LATENCY REDUCTION FOR WIRELESS DATA TRANSMISSION

(71) Applicant: Intel IP Corporation, Santa Clara, CA (US)

(72) Inventors: Hong He, Beijing (CN); Seunghee Han, San Jose, CA (US); Alexei Vladimirovich Davydov, Nizhny Novgorod (RU); Christian Ibars Casas, San Jose, CA (US); Gang Xiong, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/771,253

(22) PCT Filed: Jun. 29, 2016

(86) PCT No.: PCT/US2016/040146
§ 371 (c)(1),
(2) Date: Apr. 26, 2018

(87) PCT Pub. No.: WO2017/074522
PCT Pub. Date: May 4, 2017

(65) Prior Publication Data
US 2018/0343047 A1    Nov. 29, 2018

Related U.S. Application Data

(60) Provisional application No. 62/248,997, filed on Oct. 30, 2015.

(51) Int. Cl.
*H04W 76/27* (2018.01)
*H04B 7/06* (2006.01)

(52) U.S. Cl.
CPC .......... *H04B 7/0645* (2013.01); *H04W 76/27* (2018.02)

(58) Field of Classification Search
CPC ..... H04W 76/27; H04W 76/28; H04W 76/30; H04W 72/0413; H04W 72/042;
(Continued)

(56) References Cited

U.S. PATENT DOCUMENTS

2005/0249120 A1    11/2005  Heo et al.
2008/0225802 A1     9/2008  Sun et al.
(Continued)

FOREIGN PATENT DOCUMENTS

CN          108141413       6/2018
WO      WO-2017074522 A1    5/2017

OTHER PUBLICATIONS

"International Application Serial No. PCT/US2016/040146, International Search Report dated Sep. 12, 2016", 4 pgs.
(Continued)

*Primary Examiner* — Jean A Gelin
(74) *Attorney, Agent, or Firm* — Schwegman Lundberg & Woessner, P.A.

(57) ABSTRACT

Embodiments of latency reduction for wireless data transmission are generally described herein. A user equipment (UE) identifies a shortened transmission time interval (xTTI) length configuration for a time division duplexing (TDD) component carrier (CC), the xTTI length configuration comprising a length in time or a length in orthogonal frequency division multiplexing (OFDM) symbols. The UE identifies scheduling timing and hybrid automatic repeat request (HARQ) timing of physical downlink shared channel (PDSCH) and physical uplink shared channel (PUSCH) on the TDD CC based on the identified xTTI length configuration. The UE signals for transmission of a HARQ acknowledgement (HARQ-ACK) based on the identified xTTI length configuration.

18 Claims, 11 Drawing Sheets

(58) Field of Classification Search
CPC ......... H04W 72/0406; H04W 72/0446; H04W 72/12; H04W 24/10; H04L 1/1812; H04L 1/1854; H04L 5/001; H04L 5/1469; H04B 7/0645
See application file for complete search history.

(56) References Cited

U.S. PATENT DOCUMENTS

| | | | |
|---|---|---|---|
| 2011/0138244 | A1 | 6/2011 | Zhu et al. |
| 2015/0078221 | A1 | 3/2015 | Seo et al. |
| 2015/0124671 | A1 | 5/2015 | Tabet et al. |
| 2016/0135143 | A1* | 5/2016 | Won ................. H04W 72/005 370/312 |
| 2016/0212734 | A1* | 7/2016 | He ...................... H04L 1/1861 |
| 2017/0280454 | A1* | 9/2017 | Kusashima ............ H04J 3/00 |

OTHER PUBLICATIONS

"International Application Serial No. PCT/US2016/040146, Written Opinion dated Sep. 12, 2016", 7 pgs.

"European Application Serial No. 16860427.0, Extended European Search Report dated Apr. 24, 2019", 9 pgs.

Intel, Corporation, "Protocol impact of TTI reduction", 3GPP Draft; R2-154296 Protocol Impact of TTI Reduction, 3rd Generation Partnership Project (3GPP), Mobile Competence Centre ;650, Route Des Lucioles ; F-06921 Sophia-Anti Polis Cedex ; France, vol. RAN WG2, [Online] Retrieved from the internet: <http ://www.3gpp.org/ftp/Meeti ngs 3GPP SYNC/RAN2/Docs/>, (Oct. 4, 2015), 5 pgs.

NTT, Docomo, et al., "5G Vision for 2020 and Beyond", 3GPP Draft; RWS-150051 5G Vision Docomo, 3rd Generation Partnership Project (3GPP), Mobile Competence Centre ; 650, Route Des Lucioles ; F-06921 Sophia-Anti Polis Cedex ; France No. Phoenix, AZ, [Online] Retrieved from the internet: <http ://www.3gpp.org/ftp/workshop/2015-09-17_18_RAN_5G/Docs/>, (Sep. 3, 2015), 23 pgs.

ZTE, "Specificaiton impacts of short TTI", 3GPP Draft; R2-153514 Specification Impacts of Short TTI, 3rd Generation Partnership Project (3GPP), Mobile Competence Centre ; 650, Route Des Lucioles ; F-06921 Sophia-Antipolis Cedex ; France, vol. RAN WG2, No. Project (3GPP), [Online] Retrieved from the internet: <http://www.3gpp.org/ftp/Meetings_3GPP_SYNC/RAN2/DOCS/>, (Aug. 23, 2015), 3 pgs.

* cited by examiner

LATENCY REDUCTION FOR WIRELESS DATA TRANSMISSION

PRIORITY CLAIM

This application is a U.S. National Stage Filing under 35 U.S.C. 371 from International Application No. PCT/US2016/040146, filed on Jun. 29, 2016, and published as WO 2017/074522 on May 4, 2017, which application claims priority under 35 U.S.C. § 119 to U.S. Provisional Patent Application Ser. No. 62/248,997 filed Oct. 30, 2015, and titled "LATENCY REDUCTION FOR DATA TRANSMISSION IN WIRELESS SYSTEM," which applications are incorporated herein by reference in their entirety.

TECHNICAL FIELD

Embodiments pertain to wireless communications. Some embodiments relate to radio access network layer 1 (RAN1). Some embodiments relate to systems and methods to reduce latency for data transmission in a wireless system.

BACKGROUND

Latency and throughput are some of the factors in measuring network performance and defining the speed of a network. Whereas throughput may refer to the quantity of data that can pass from source to destination in a specific time, round trip time (RTT) latency may refer to the time it takes for a single data transaction to occur, meaning the time it takes for the packet of data to travel to and from the destination, back to the source.

Thus, there are general needs for systems and methods for to reduce latency for data transmission in a wireless system.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
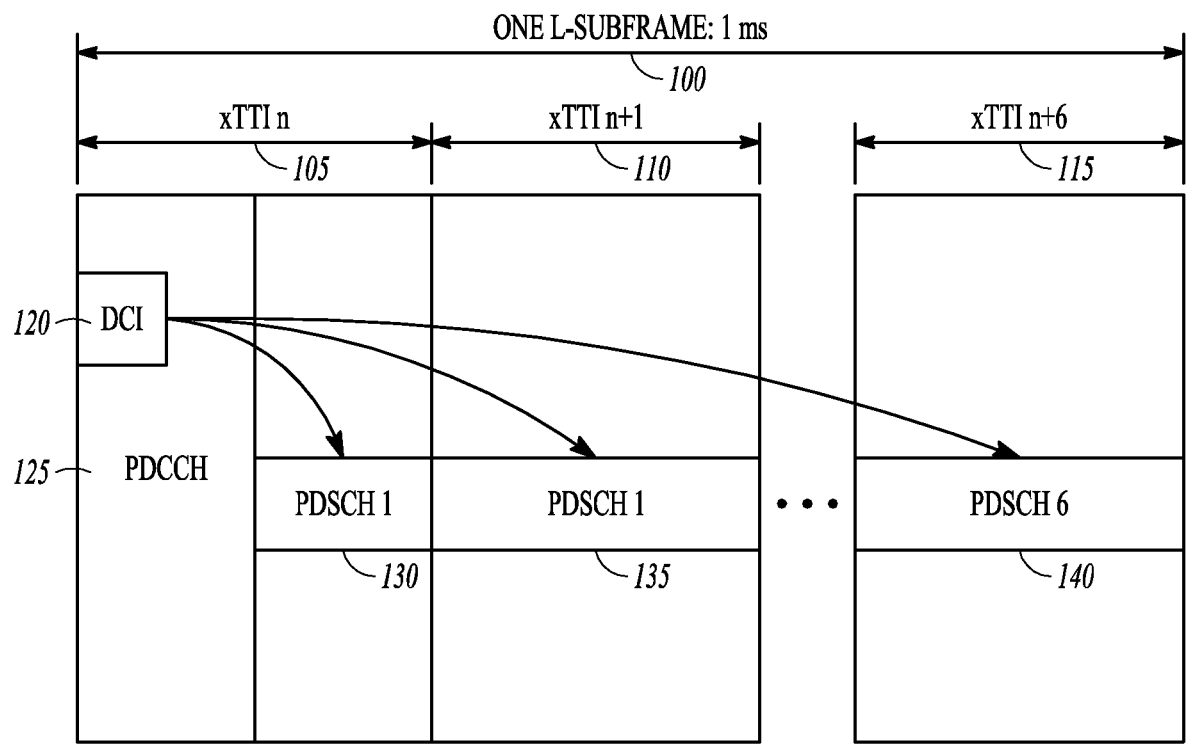
FIG. 1 illustrates an example of shortened Transmission Time Interval scheduling within a Long Term Evolution subframe in accordance with some embodiments.

FIG. 1 illustrates an example of shortened Transmission Time Interval (xTTI) scheduling within a Long Term Evolution subframe (L-subframe) 100. In the example of FIG. 1, seven xTTIs (numbered n . . . n+6) 105, 110, and 115 are illustrated. A single downlink control information (DCI) 120 in physical downlink control channel (PDCCH) 125 is used to schedule physical downlink shared channel (PDSCH) transmissions 130, 135, 140. This multi-xTTI scheduling mechanism may also be applicable to uplink channel. This technique reduces the decoding latency of each PDSCH in xTTI and then allow a faster acknowledgement/non-acknowledgement (ACK/NACK) feedback for a portion of PDSCHs that are earlier transmitted in the L-TTI/L-subframe 100. The mapping relationship between the x-subframes 105-115 for allocating resources and the L-subframe 100 for transmitting in the multiple xTTIs scheduling is signaled by means of bitmap.

Various aspects and features of the disclosure are described in further detail below to support DL/UL data transmission in xTTI with hybrid automatic repeat request (HARQ) in order to improve reliability.

A first design provides a HARQ timeline for xTTI of 0.5 ms length. In this design, each L-TTI is partitioned into two xTTIs each with 0.5 ms length in time without changing transmission direction to keep backward compatibility. Using 0.5 ms xTTI, each radio frame of 10 ms length thus includes 20 xTTIs with indices for 0 through 19.

The supported UL-DL configuration using xTTIs are listed in Table 1, where for each xTTI in a radio frame, "D" denotes the xTTI is reserved for downlink transmission, "U" denotes the xTTI is reserved for uplink transmission and "S" denotes a special subframe with at least two of three fields downlink pilot time slot (DwPTS), GP and UpPTS depending on configuration of special subframe, "D/S" denotes a subframe that may be either normal DL subframe in xTTI or a special subframe including DwPTS and GP only, without UpPTS.

TABLE 1

Uplink-downlink configurations with xTTI.

| UL/DL | xTTI number | | | | | | | | | | | | | | | | | | | |
|---|---|---|---|---|---|---|---|---|---|---|---|---|---|---|---|---|---|---|---|---|
| Config | 0 | 1 | 2 | 3 | 4 | 5 | 6 | 7 | 8 | 9 | 10 | 11 | 12 | 13 | 14 | 15 | 16 | 17 | 18 | 19 |
| 0 | D | D | D/S | S | U | U | U | U | U | U | D | D | D/S | S | U | U | U | U | U | U |
| 1 | D | D | D/S | S | U | U | U | U | U | D | D | D | D/S | S | U | U | U | U | D | D |
| 2 | D | D | D/S | S | U | U | D | D | D | D | D | D | D/S | S | U | U | D | D | D | D |
| 3 | D | D | D/S | S | U | U | U | U | U | U | D | D | D | D | D | D | D | D | D | D |
| 4 | D | D | D/S | S | U | U | U | U | D | D | D | D | D | D | D | D | D | D | D | D |
| 5 | D | D | D/S | S | U | U | D | D | D | D | D | D | D | D | D | D | D | D | D | D |
| 6 | D | D | D/S | S | U | U | U | U | U | U | D | D | D/S | S | U | U | U | U | D | D |

In some aspects, various schemes may be used to minimize the HARQ RTT for DL and UL data transmission. These schemes may assume a Physical Uplink Control Channel (PUCCH) is present in each UL xTTI to minimize the ACK/NACK feedback latency. Similarly, Physical HARQ Indicator Channel (PHICH) is assumed to be present in respective TTI for the same purpose.

account. In general, HARQ improves link level performance and reduces residual packet error rates by compensating for link adaptation errors. However, HARQ may also introduce additional latency. Therefore, it is beneficial to study mechanisms which can improve the performance and reliability of link rate adaptation. In some aspects of the subject technology, backwards compatibility is preserved, allowing normal

TABLE 2

Downlink association set index K: $\{k_0, k_1, \ldots, k_{M-1}\}$ for TDD with xTTI

| UL/DL Configuration | | 0~3 | 4 | 5 | 6 | 7 | 8 | 9 | 10~13 | 14 | 15 | 16 | 17 | 18 | 19 |
|---|---|---|---|---|---|---|---|---|---|---|---|---|---|---|---|
| 0 | Alt.1 | | 4 | 4 | 4 | 4 | | | | 4 | 4 | 4 | 4 | | |
|   | Alt.2 | | 4 | 4 | 4 | 4 | | | | 4 | 4 | 4 | 4 | | |
| 1 | Alt.1 | | 4~6 | 4 | 4 | 4 | | | | 4~6 | 4 | 4 | 4 | | |
|   | Alt.2 | | 5, 6 | 4, 5 | 4 | 4 | | | | 5, 6 | 4, 5 | 4 | 4 | | |
| 2 | Alt.1 | | 4~8, 11, 12 | 4 | | | | | | 4~8, 11, 12 | 4 | | | | |
|   | Alt.2 | | 12, 11, 8, 7 | 4~7 | | | | | | 12, 11, 8, 7 | 4~7 | | | | |
| 3 | Alt.1 | | 4~14 | 4 | 4 | 4 | | | | | | | | | |
|   | Alt.2 | | 12~14 | 10~12 | 9, 10 | 8, 9 | 7, 8 | 6, 7 | | | | | | | |
| 4 | Alt.1 | | 4~16 | 4 | 4 | 4 | | | | | | | | | |
|   | Alt.2 | | 13~16 | 10~13 | 7~10 | 4~7 | | | | | | | | | |
| 5 | Alt.1 | | 4~18, 21, 22 | 4 | | | | | | | | | | | |
|   | Alt.2 | | 22, 21, 12~18 | 4~12 | | | | | | | | | | | |
| 6 | Alt.1 | | 4~6 | 4 | 4 | 4 | | | | 4 | 4 | 4 | 4 | | |
|   | Alt.2 | | 6 | 6 | 6 | 6 | 6 | 6 | | 4 | 4 | 4 | 4 | | |

In general, the PDSCH HARQ timeline can be described as: if there is PDSCH transmission indicated by the detection of corresponding PDCCH or there is PDCCH indicating downlink semi-persistent scheduling (SPS) release in subframe(s) n−k, where k∈K and K is defined in Table 2 as a set of M element $\{k_0, k_1, \ldots, k_{M-1}\}$ depending on the subframe n and the UL/DL configuration, UE sends HARQ-ACK in subframe n. There are two design approaches for feedback HARQ-ACK for PDSCH in xTTI in TDD system.

As set forth above, latency and throughput are some of the factors in measuring network performance and defining the speed of a network. Whereas throughput may refer to the quantity of data that can pass from source to destination in a specific time, round trip time (RTT) latency may refer to the time it takes for a single data transaction to occur, meaning the time it takes for the packet of data to travel to and from the destination, back to the source.

In developing some prior wireless systems, effort has been put into increasing data rates from Long Term Evolution (LTE) release 8 until LTE release 12. Specifically, technologies such as Carrier Aggregation (CA), 8×8 multiple input multiple output (MIMO), and 256 quadrature amplitude modulation (QAM) have raised the technology potential of the L1 data rate from 300 megabits per second (Mbps) to 4 gigabits per second (Gbps). However, there is a need for further improvements specifically targeting the delays in the system.

In an LTE system, there are multiple components contributing to the total end-to-end delay for connected user equipments (UEs). Specifically, Transmission Time Interval (TTI) is one element as the transmission of a request, grant, or data is done in subframe chunks in a TTI (1 ms), which is the source of a delay per packet exchange between the UE and the evolved NodeB (eNodeB or eNB). Further, processing time is another delay source as data and control need to be processed (e.g., encoded and decoded) in the UE and the eNodeB, which may be proportional to the transport block (TB) size. In addition, hybrid automatic repeat request (HARQ) Round Trip Time (RTT) may also be taken into operation of UEs that do not implement the subject technology alongside other UEs that do.

Taking the three elements identified above into account, the packet latency can be reduced with a reduction of transport time of data and control by addressing the length of a TTI. This length of the TTI may have an impact on both of (i) the time for transmitting over the air (Element 1) and (ii) processing time (Element 2) in transmitter and receivers. In addition, aspects of the subject technology address how to define an efficient HARQ acknowledgement (HARQ-ACK) timeline for data transmitted in a system using shortened TTI (xTTI) length (e.g. 0.5 milliseconds (ms), 2 orthogonal frequency division multiplexing (OFDM) symbols, or 1 OFDM symbol) to minimize the HARQ RTT latency (Element 3) while still preserves the backward compatibility.

Aspects of the subject technology provide, among other things, solutions for physical downlink shared channel (PDSCH)/physical uplink shared channel (PUSCH) scheduling timing and HARQ-ACK feedback timeline, which enable PDSCH/PUSCH transmission with a minimized RTT latency in a backward compatible manner.

Aspects of the subject technology provide, among other things, techniques for PDSCH/PUSCH scheduling timing and HARQ-ACK feedback timeline with shortened TTIs (i.e. 0.5 ms, 1 or 2 OFDM symbols). More specifically, a self-contained HARQ-ACK window concept may be used to enable fast downlink (DL) HARQ-ACK feedback by means of utilizing the first available uplink (UL) xTTIs in uplink pilot time slot (UpPTS) or normal UL subframes. Alternatively, to avoid any impact on PUSCH scheduling for legacy UEs, one embodiment uses a part of guard period (GP) in a self-contained HARQ-ACK window to transmit HARQ-ACK.

In this document, shortened TTI may be referred to as xTTI, and conventional LTE TTI may be referred to as L-TI. L-TTI includes legacy LTE TTI of 1 ms length.

In one design of PDSCH or PUSCH scheduling in an xTTI, a single DL control channel in xTTI schedules a single PDSCH transmission in one xTTI or a single PUSCH transmission in one xTTI. Each such control channel scheduling transmission consumes certain resources, which may, in some implementations, be a significant amount of radio resources available for transmissions. Alternatively, scheduling information for multiple xTTIs (e.g. 7 xTTIs) within a 1 ms L-TTI is provided in a single downlink control information (DCI) format transmitted in the physical downlink control channel (PDCCH). Such multi-subframe scheduling may allow for reduced control signaling overhead for scheduling UL or DL transmission.

Figure 2:
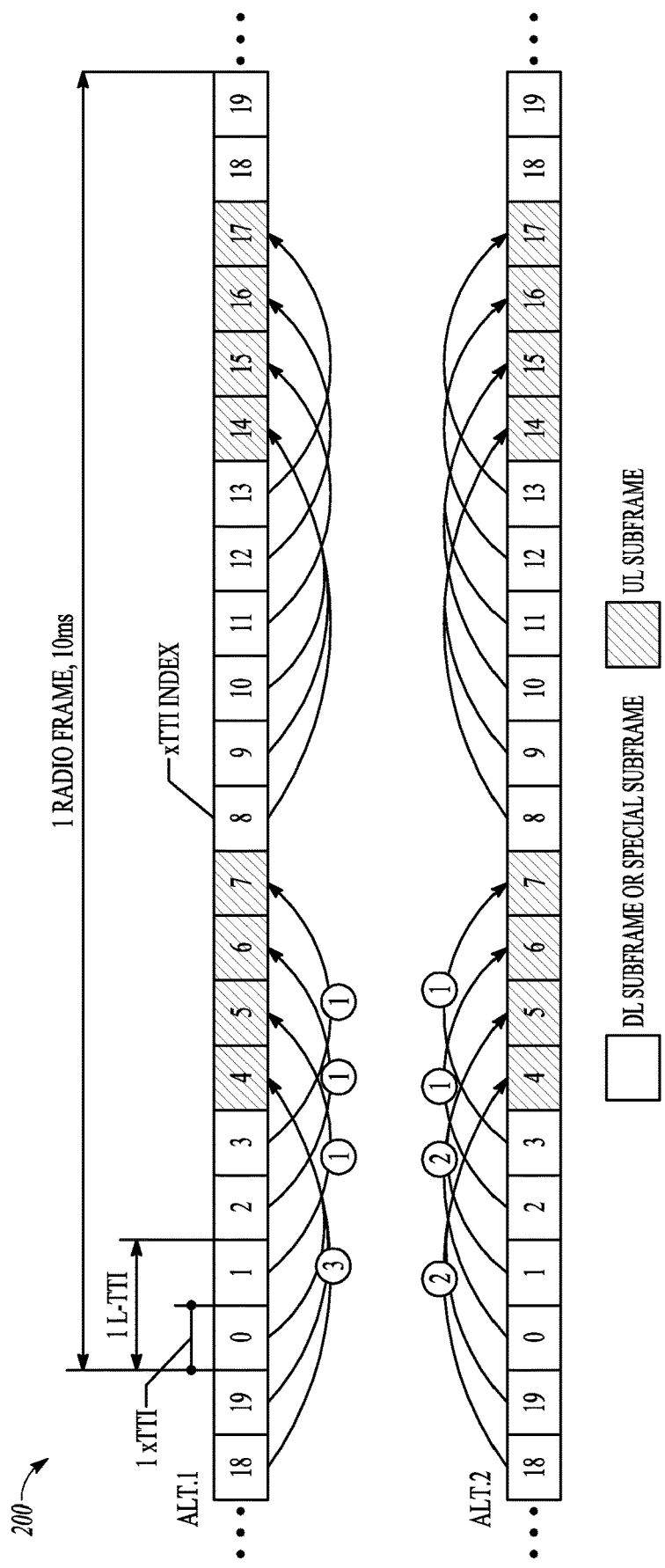
FIG. 2 illustrates an example physical downlink shared channel (PDSCH) hybrid automatic repeat request (HARQ) timeline for a radio frame in accordance with some embodiments.

FIG. 2 illustrates a PDSCH HARQ timeline for a radio frame 200 according to two alternatives—Alt. 1 and Alt. 2. Alt. 1 has a 3:1:1:1 mapping of HARQ-ACK feedback from six DL subframes to four UL subframes. Alt. 2 has a 2:2:1:1 mapping of HARQ-ACK feedback from six DL subframes to four UL subframes.

In one design, the HARQ-ACK delay for a given PDSCH in an xTTI may be minimized by employing the first available UL xTTI to transmit PDSCH HARQ-ACK as alternative 1 (Alt. 1) of Table 2. A benefit of this approach is that it is simple and can effectively reduce HARQ RTT value. A disadvantage may include that the HARQ-ACK payload for multiple DL subframes are not evenly distributed over the available UL subframe(s). As an example of UL/DL configuration 1, as shown in FIG. 2, the HARQ-ACK feedback associated with subframes #18, #19 and #0 are concentrated on xTTI #4, which is three times larger than that in other subframes. As a result, it unnecessarily complicates the eNodeB for PUSCH scheduling.

To address this problem, another design is to distribute HARQ-ACK payload over consecutive UL subframes as evenly as possible. The corresponding n and k values are proposed as Alt 2 in Table 2. Further. FIG. 2 illustrates the differences between the two alternatives.

For 0.5 ms xTTI configuration, the PUSCH scheduling timing and the corresponding HARQ ACK/NACK timing on PHICH are further disclosed below to enable PUSCH transmission in xTTIs.

For a time division duplex (TDD) UL/DL configuration, the UE, upon detection of a PDCCH with uplink DCI format and/or a PHICH transmission in subframe n intended for the UE, adjusts the corresponding PUSCH transmission in subframe n+k, where k given in Table 2, according to the PDCCH and PHICH information.

For TDD UL/DL configuration 0 and HARQ operation, the UE, upon detection of a PDCCH with uplink DCI format and % or a PHICH transmission in subframe n intended for the UE, adjusts the corresponding PUSCH transmission in subframe n+k if the most significant bit (MSB) of the UL index in the DCI format 0 is set to 1 or if PHICH is received in subframe n=0, 1, 10 or 11 in the resource corresponding to $I_{PHICH}=0$ with the smaller k value of two candidates given in Table 2. Otherwise, the UE adjusts the corresponding PUSCH transmission in subframe n+k if the least significant bit (LSB) of the UL index in the DCI format 0 is set to 1 or PHICH is received in subframe n=0, 1, 10 or 11 in the resource corresponding to $I_{PHICH}=1$ with the larger k value of two candidates given in Table 2.

TABLE 3 k for TDD UL/DL configuration 0-6 with xTTI = 0.5 ms
Case1 (xTTI = 0.5 ms)

| UL/DL Config | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 4, 5 | 5, 6 | 6 | 6 | | | | | | | 4, 5 | 5, 6 | 6 | 6 | | | | | | |
| 1 | 4 | 4 | 4 | 4 | | | | | | | 4 | 4 | 4 | 4 | | | | | | |
| 2 | 4 | 4 | | | | | | | | | 4 | 4 | | | | | | | | |
| 3 | 6 | 6 | 6 | 6 | | | | | | | | | | | | | | | 6 | 6 |
| 4 | 4 | 4 | 4 | 4 | | | | | | | | | | | | | | | | |
| 5 | 4 | 4 | | | | | | | | | | | | | | | | | | |
| 6 | 6 | 6 | 6 | 6 | | | | | | | 4 | 4 | 4 | 4 | | | | | 6 | 6 |

In the PHICH assignment procedure, for scheduled PUSCH transmissions in subframe n, the UE determines the corresponding PHICH resource in subframe n+ $k_{PHICH}$, where $k_{PHICH}$ is given in Table 4.

TABLE 4

$k_{PHICH}$ for TDD with xTTI = 0.5 ms
Case 1: xTTI = 0.5 ms

| UL/DL Config | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 5 | 5 | 4 | 4 | 4 | | | | | 6 | 5 | 5 | 4 | 4 | 4 |
| 1 | | | | | 6 | 6 | 6 | 6 | | | | | | | 6 | 6 | 6 | 6 | | |
| 2 | | | | | 6 | 6 | | | | | | | | | 6 | 6 | | | | |
| 3 | | | | | 14 | 14 | 14 | 14 | 14 | 14 | | | | | | | | | | |
| 4 | | | | | 16 | 16 | 16 | 16 | | | | | | | | | | | | |
| 5 | | | | | 14 | 14 | | | | | | | | | | | | | | |
| 6 | | | | | 6 | 6 | 6 | 6 | 10 | 10 | | | | | 6 | 6 | 6 | 6 | | |

Figure 3:
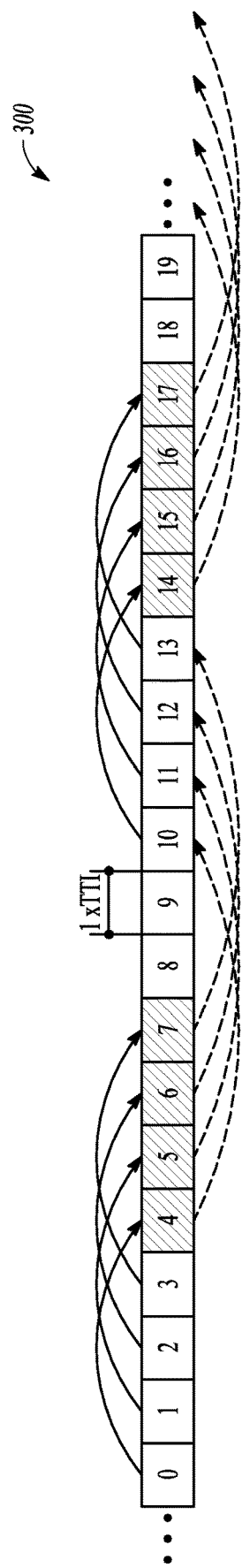
FIG. 3 illustrates an example physical uplink shared channel (PUSCH) scheduling and hybrid automatic repeat request (HARQ) timeline in accordance with some embodiments.

FIG. 3 illustrates an example PUSCH scheduling and HARQ timeline 300 for 0.5 ms xTTI for UL/DL configuration 1 in accordance with some embodiments. FIG. 3 is an illustrative example of a TDD serving cell based on the disclosed table presented above. In FIG. 3, the solid line indicates the PUSCH scheduling timings and the dashed lines indicates PHICH timings. As illustrated in FIG. 3, a TDD serving cell supports the 0.5 ms xTTI configuration. In the example embodiment illustrated in FIG. 3, Tables 3-4 are used to determine the PUSCH scheduling timing and PHICH timing, respectively. Thus, utilizing the n−k calculation of Table 2, xTTI #4, #5, #6, and #7 are scheduled by xTTI #0, #1, #2, and #3, respectively.

A second design of the subject technology is directed to a self-contained backward compatible frame structure type 2 for latency reduction.

Figure 4:
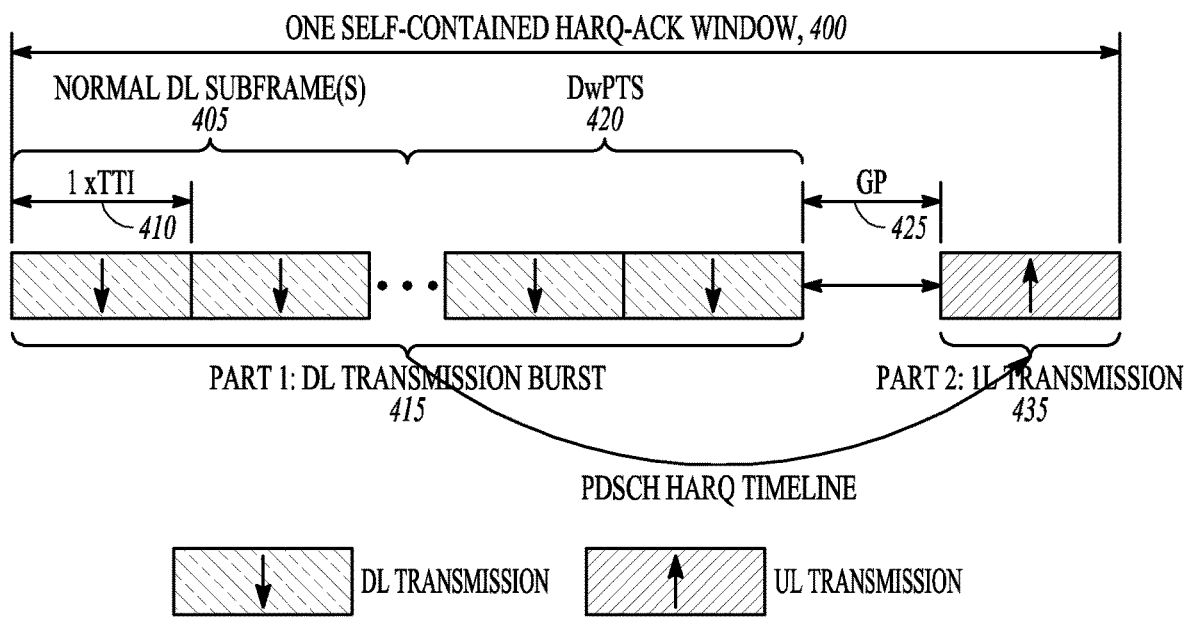
FIG. 4 illustrates a first self-contained hybrid automatic repeat request (HARQ) acknowledgement (ACK) window in accordance with some embodiments.

FIG. 4 illustrates a self-contained HARQ-ACK window 400. The window 400 may be used for HARQ-ACK feedback for PDSCH transmission in DL xTTI(s). In particular, as shown in FIG. 4, each self-contained HARQ-ACK window 400 may be partitioned into three periods based on the UL/DL configuration broadcasted in system information block type 2 (SIB2), including DL transmission burst 415, guard period (GP) 425, and UL transmission 435.

According to one design, the DL transmission burst 415 includes the duration reserved for downlink transmission between two consecutive UpPTS fields; GP 425 is signaled based on UL/DL configuration; and the UL transmission 435 includes the duration reserved for UL transmission between two consecutive DwPTS fields.

According to one design, the UL transmission 435 may carry HARQ-ACK bits for all PDSCH transmissions within DL transmission burst 415 in a same self-contained HARQ-ACK window 400. The DL transmission burst 415 may include one or more normal DL subframe(s) 405 (e.g., L-TTI(s)) and DwPTS 420, which are further partitioned into multiple xTTIs 410. The UL transmission 435 may include one or more of, a new UL channel transmitted in the GP 425 that is transparent to legacy UEs, UpPTS, or one or more UL xTTI(s) in the first UL L-TTI following UpPTS.

In one implementation based on FIG. 4, the length of the xTTI is two OFDM symbols and TDD UL/DL configuration 2 is used. This implementation is illustrated in FIG. 5, which shows data 500 for PDSCH transmission.

Figure 5:
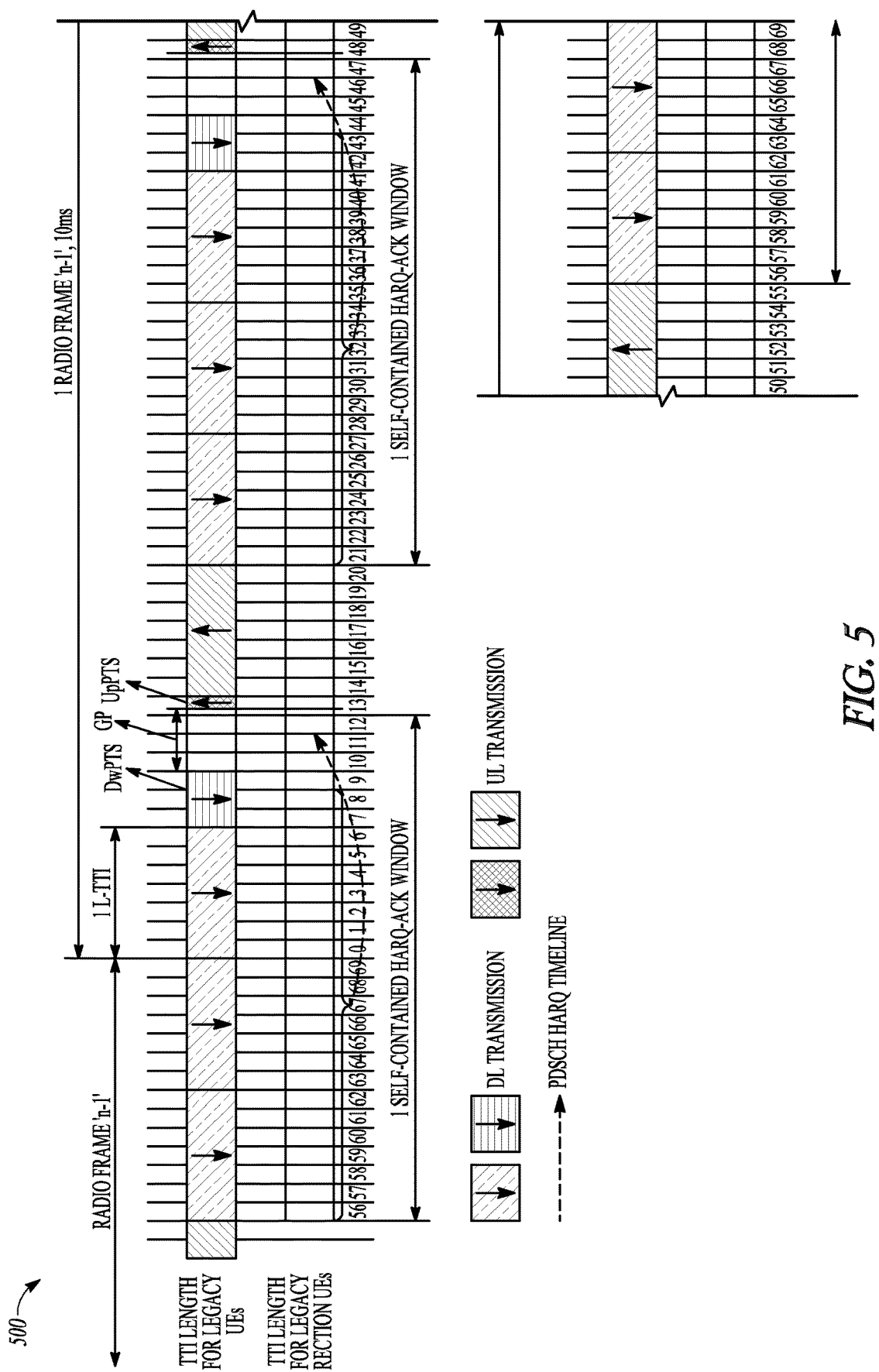
FIG. 5 illustrates data 500 for physical downlink shared channel (PDSCH) transmission.

According to the implementation illustrated in FIG. 5, one self-contained HARQ-ACK window includes: one DL transmission period of xTTI #56-#69 in radio frame n−1 and xTTI #0-#8 in radio frame n, and one corresponding UL transmission period in xTTI #12 in radio frame n. More specifically, based on the proposed self-contained HARQ-ACK feedback, the UL transmission in xTTI #12 may be used to convey the HARQ-ACK bits for all of PDSCHs within the DL transmission period of same self-contained HARQ-ACK window. One alternative design may include PUCCH/PUSCH in xTTI #13 or #14 to be used for HARQ-ACK transmission.

Further, as shown in FIG. 5, another self-contained HARQ-ACK window includes: one DL transmission period including xTTI #21-#43 and one corresponding UL transmission in xTTI #47 for HARQ-ACK bits transmission associated with DL xTTI #21-#43.

Following the basic rule of the self-contained DL HARQ-ACK window proposed above, various techniques may be used to implement PDSCH HARQ timeline for xTTI=1 or 2 OFDM symbols.

According to a first technique, the physical UL channel carrying uplink control information (UCI) (e.g., HARQ-ACK bits) is transmitted in the xTTI(s) within the UL L-TTI(s). In detail, if there is PDSCH transmission indicated by the detection of a corresponding PDCCH or there is PDCCH indicating downlink SPS release in subframe(s) n−k, where k∈K, and where K is defined according to Tables 5-11 below as a set of M elements $\{k_0, k_1, \ldots, k_{M-1}\}$ depending on the subframe n and the UL/DL configuration, the UE sends HARQ-ACK in subframe n. The two alternatives (Alt. 1 and Alt. 2) in Tables 5-11 are proposals for xTTI=0.5 ms. Alt. 1 follows the rule to use the first UL xTTIs within the first available normal UL L-TTI for HARQ-ACK feedback. Alt. 2 aims to distribute the HARQ-ACK payloads across available UL xTTIs within the available normal UL L-TTIs evenly.

TABLE 5

DL xTTIs set index K: $\{k_0, k_1, \ldots, k_{M-1}\}$ for UL/DL configurations 0, 1, 2 (xTTI = 2 OFDM symbols)

| Configuration UL-DL | | xTTI index n | | | | | | |
|---|---|---|---|---|---|---|---|---|
| | | 0~13 35~48 | 14 49 | 15 50 | 16 51 | 17 52 | 18 53 | 19 54 | 20 55 |
| 0 | Alt1 | | 4~14 | 4 | 4 | | | | |
| | Alt2 | | 14 | 14 | 14 | 14 | 14 | 14 | 14 |
| 1 | Alt1 | | 4~21 | 4 | 4 | | | | |
| | Alt2 | | 21, 20 | 20, 19 | 19, 18 | 18, 17 | 17, 16 | 16, 15 | 15, 14 |
| 2 | Alt1 | | 4~28 | 4 | 4 | | | | |
| | Alt2 | | 25~28 | 22~25 | 19~22 | 16~19 | 13~16 | 10~13 | 7~10 |

| Configuration UL-DL | | xTTI index n | | | | | | | | | | | | | |
|---|---|---|---|---|---|---|---|---|---|---|---|---|---|---|
| | | 21 56 | 22 57 | 23 58 | 24 59 | 25 60 | 26 61 | 27 62 | 28 63 | 29 64 | 30 65 | 31 66 | 32 67 | 33 68 | 34 69 |
| 0 | Alt1 | | | | | | | | | | | | | | |
| | Alt2 | 14 | 14 | 14 | 14 | 14 | 14 | | | | | | | | |
| 1 | Alt1 | | | | | | | | | | | | | | |
| | Alt2 | 14 | 14 | 14 | 14 | 14 | 14 | | | | | | | | |
| 2 | Alt1 | | | | | | | | | | | | | | |
| | Alt2 | | | | | | | | | | | | | | |

TABLE 6

DL xTTIs set index K: {k₀, k₁, . . . , k_{M−1}} for UL/DL configurations 3, 4, 5 (xTTI = 2 OFDM symbols)

| UL-DL Configuration | xTTI index n | | | | | | | | | | |
|---|---|---|---|---|---|---|---|---|---|---|---|
| | 0~13 | 14 | 15 | 16 | 17 | 18 | 19 | 20 | 21 | 22 | 23 | 24 |
| 3 (Alt1) | | 4~49 | 4 | 4 | | | | | | | | |
| 3 (Alt2) | | 47~49 | 45~47 | 43~45 | 41~43 | 39~41 | 37~39 | 35~37 | 35, 34 | 34, 33 | 33, 32 | 32, 31 |
| 4 (Alt1) | | 4~56 | 4 | 4 | | | | | | | | |
| 4 (Alt2) | | 53~56 | 50~53 | 47~50 | 44~47 | 41~44 | 38~41 | 35~38 | 32~35 | 29~32 | 26~29 | 23~26 |
| 5 (Alt1) | | 4~63 | 4 | 4 | | | | | | | | |
| 5 (Alt2) | | 55~63 | 47~55 | 39~47 | 31~39 | 23~31 | 15~23 | 8~15 | | | | |

| UL-DL Configuration | xTTI index n | | | | | | | | | | |
|---|---|---|---|---|---|---|---|---|---|---|---|
| | 25 | 26 | 27 | 28 | 29 | 30 | 31 | 32 | 33 | 34 | 35~69 |
| 3 (Alt1) | | | | | | | | | | | |
| 3 (Alt2) | 31, 30 | 30, 29 | 29, 28 | 28, 27 | 27, 26 | 26, 25 | 25, 24 | 24, 23 | 23, 22 | 22 | |
| 4 (Alt1) | | | | | | | | | | | |
| 4 (Alt2) | 20~23 | 17~20 | 15~17 | | | | | | | | |
| 5 (Alt1) | | | | | | | | | | | |
| 5 (Alt2) | | | | | | | | | | | |

TABLE 7

DL xTTIs set index K: {k₀, k₁, . . . , k_{M−1}} for UL/DL configurations 6 (xTTI = 2 OFDM symbols)

| | xTTI index n | | | | | | | | | | | | | | | | | | | | | |
|---|---|---|---|---|---|---|---|---|---|---|---|---|---|---|---|---|---|---|---|---|---|---|
| | 0~13 | 14 | 15 | 16 | 17 | 18 | 19 | 20 | 21 | 22 | 23 | 24 | 25 | 26 | 27 | 28 | 29 | 30 | 31 | 32 | 33 | 34 |
| Alt.1 | | 4~21 | 4 | 4 | | | | | | | | | | | | | | | | | | |
| Alt.2 | | 21 | 21 | 21 | 21 | 21 | 21 | 21 | 21 | 21 | 21 | 21 | 21 | 21 | 21 | 21 | 21 | 21 | 21 | 21 | 21 | 21 |

| | 35~48 | 49 | 50 | 51 | 52 | 53 | 54 | 55 | 56 | 57 | 58 | 59 | 60 | 61 | 62 | 63 | 64 | 65 | 66 | 67 | 68 | 69 |
|---|---|---|---|---|---|---|---|---|---|---|---|---|---|---|---|---|---|---|---|---|---|---|
| Alt.1 | | 4~14 | 4 | 4 | | | | | | | | | | | | | | | | | | |
| Alt.2 | | 14 | 14 | 14 | 14 | 14 | 14 | 14 | 14 | 14 | 14 | 14 | 14 | 14 | 14 | 14 | 14 | 14 | 14 | 14 | 14 | 14 |

TABLE 8

DL xTTIs set index K: {k₀, k₁, . . . , k_{M−1}} for UL/DL configurations 0, 1, 2 (xTTI = 1 OFDM symbols)

| UL/DL Configuration | | xTTI index n | | | | | | | |
|---|---|---|---|---|---|---|---|---|---|
| | | 0~27 (70~97) | 28 (98) | 29 (99) | 30 (100) | 31 (101) | 32 (102) | 33 (103) | 34 (104) |
| 0 | Alt.1 | | 4~28 | 4 | 4 | 4 | | | |
| | Alt.2 | | 28 | 28 | 28 | 28 | 28 | 28 | 28 |
| 1 | Alt.1 | | 4~42 | 4 | 4 | 4 | | | |
| | Alt.2 | | 42, 41 | 41, 40 | 40, 39 | 39, 38 | 38, 37 | 37, 36 | 36, 35 |
| 2 | Alt.1 | | 4~56 | 4 | 4 | 4 | | | |
| | Alt.2 | | 53~56 | 50~53 | 47~50 | 44~47 | 41~44 | 38~41 | 35~38 |

| UL/DL Configuration | | xTTI index n | | | | | | |
|---|---|---|---|---|---|---|---|---|
| | | 35 (105) | 36 (106) | 37 (107) | 38 (108) | 39 (109) | 40 (110) | 41 (111) |
| 0 | Alt.1 | | | | | | | |
| | Alt.2 | 28 | 28 | 28 | 28 | 28 | 28 | 28 |
| 1 | Alt.1 | | | | | | | |
| | Alt.2 | 35, 34 | 34, 33 | 33, 32 | 32, 31 | 31, 30 | 30, 29 | 29, 28 |
| 2 | Alt.1 | | | | | | | |
| | Alt.2 | 32~35 | 29~32 | 26~29 | 23~26 | 20~23 | 17~20 | 14~17 |

| UL/DL Configuration | | xTTI index n | | | | | | |
|---|---|---|---|---|---|---|---|---|
| | | 42 (112) | 43 (113) | 44 (114) | 45 (115) | 46 (116) | 47 (117) | 48 (118) | 49 (119) |
| 0 | Alt.1 | | | | | | | | |
| | Alt.2 | 28 | 28 | 28 | 28 | 28 | 28 | 28 | 28 |

TABLE 8-continued

DL xTTIs set index K: {k₀, k₁, ..., $k_{M-1}$} for UL/DL
configurations 0, 1, 2 (xTTI = 1 OFDM symbols)

| | | | | | | | | | |
|---|---|---|---|---|---|---|---|---|---|
| 1 | Alt.1 | | | | | | | | |
|   | Alt.2 | 28 | 28 | 28 | 28 | 28 | 28 | 28 | 28 |
| 2 | Alt.1 | | | | | | | | |
|   | Alt.2 | | | | | | | | |

| | | xTTI index n | | | | | | |
|---|---|---|---|---|---|---|---|---|
| UL/DL Configuration | | 50 (120) | 51 (121) | 52 (122) | 53 (123) | 54 (124) | 55 (125) | 56~69 (126~139) |
| 0 | Alt.1 | | | | | | | |
|   | Alt.2 | 28 | 28 | 28 | 28 | 28 | 28 | |
| 1 | Alt.1 | | | | | | | |
|   | Alt.2 | 28 | 28 | 28 | 28 | 28 | 28 | |
| 2 | Alt.1 | | | | | | | |
|   | Alt.2 | | | | | | | |

TABLE 9

DL xTTIs set index K: {k₀, k₁, ..., $k_{M-1}$} for UL/DL configurations 3 (xTTI = 1 OFDM symbol)

| | xTTI index N | | | | | | | | | | | | | |
|---|---|---|---|---|---|---|---|---|---|---|---|---|---|---|
| | 0~27 | 28 | 29 | 30 | 31 | 32 | 33 | 34 | 35 | 36 | 37 | 38 | 38 | 40 | 41 |
| Alt.1 | | 4~98 | 4 | 4 | 4 | | | | | | | | | | |
| Alt.2 | | 96~98 | 94~96 | 92~94 | 90~92 | 88~90 | 86~88 | 84~86 | 82~84 | 80~82 | 78~80 | 76~78 | 74~76 | 72~74 | 70~72 |

| | 42 | 43 | 44 | 45 | 46 | 47 | 48 | 49 | 50 | 51 | 52 | 53 | 54 | 55 |
|---|---|---|---|---|---|---|---|---|---|---|---|---|---|---|
| Alt.1 | | | | | | | | | | | | | | |
| Alt.2 | 70, 69 | 69, 68 | 68, 67 | 67, 66 | 66, 65 | 65, 64 | 64, 63 | 63, 62 | 62, 61 | 61, 60 | 60, 59 | 59, 58 | 58, 57 | 57, 56 |

| | 56 | 57 | 58 | 59 | 60 | 61 | 62 | 63 | 64 | 65 | 66 | 67 | 68 | 69 | 70~139 |
|---|---|---|---|---|---|---|---|---|---|---|---|---|---|---|---|
| Alt.1 | | | | | | | | | | | | | | | |
| Alt.2 | 56, 55 | 55, 54 | 54, 53 | 53, 52 | 52, 51 | 51, 50 | 50, 49 | 49, 48 | 48, 47 | 47, 46 | 46, 45 | 45, 44 | 44, 43 | 43, 42 | |

TABLE 10

DL xTTIs set index K: {k₀, k₁, ..., $k_{M-1}$} for UL/DL
configurations 4,5 (xTTI = 1 OFDM symbol)

| UL/DL Configuration | | xTTI index n | | | | | |
|---|---|---|---|---|---|---|---|
| | | 0~27 | 28 | 29 | 30 | 31 | 32 | 33 |
| 4 | Alt.1 | | 4~112 | 4 | 4 | 4 | | |
|   | Alt.2 | | 109~112 | 106~109 | 103~106 | 100~103 | 97~100 | 94~97 |
| 5 | Alt.1 | | 4~126 | 4 | 4 | 4 | | |
|   | Alt.2 | | 118~126 | 110~118 | 102~110 | 94~102 | 86~94 | 78~86 |

| UL/DL Configuration | | xTTI index n | | | | | | |
|---|---|---|---|---|---|---|---|---|
| | | 34 | 35 | 36 | 37 | 38 | 39 | 40 | 41 |
| 4 | Alt.1 | | | | | | | | |
|   | Alt.2 | 91~94 | 88~91 | 85~88 | 82~85 | 79~82 | 76~79 | 73~76 | 70~73 |
| 5 | Alt.1 | | | | | | | | |
|   | Alt.2 | 70~78 | 62~70 | 54~62 | 46~54 | 38~46 | 30~38 | 22~30 | 14~22 |

| UL/DL Configuration | | xTTI index n | | | | | | |
|---|---|---|---|---|---|---|---|---|
| | | 42 | 43 | 44 | 45 | 46 | 47 | 48 | 49 |
| 4 | Alt.1 | | | | | | | | |
|   | Alt.2 | 67~70 | 64~67 | 61~64 | 58~61 | 55~58 | 52~55 | 49~52 | 46~49 |
| 5 | Alt.1 | | | | | | | | |
|   | Alt.2 | | | | | | | | |

TABLE 10-continued

DL xTTIs set index K: {k₀, k₁, ..., k_{M-1}} for UL/DL configurations 4,5 (xTTI = 1 OFDM symbol)

| UL/DL Configuration | | xTTI index n | | | | | |
|---|---|---|---|---|---|---|---|
| | | 50 | 51 | 52 | 53 | 54 | 55 | 56~139 |
| 4 | Alt.1 | | | | | | | |
|   | Alt.2 | 43~46 | 40~43 | 37~40 | 34~37 | 31~34 | 28~31 | |
| 5 | Alt.1 | | | | | | | |
|   | Alt.2 | | | | | | | |

TABLE 11

DL xTTIs set index K: {k₀, k₁, ..., k_{M-1}} for UL/DL configurations 6 (xTTI = 1 OFDM symbol)

| | xTTI index n | | | | | | | | | | | | | | | | | | |
|---|---|---|---|---|---|---|---|---|---|---|---|---|---|---|---|---|---|---|---|
| | 0~27 | 28 | 29 | 30 | 31 | 32 | 33 | 34 | 35 | 36 | 37 | 38 | 39 | 40 | 41 | 42 | 43 | 44 | 45 |
| Alt.1 | | 4~42 | 4 | 4 | 4 | | | | | | | | | | | | | | |
| Alt.2 | | 42 | 42 | 42 | 42 | 42 | 42 | 42 | 42 | 42 | 42 | 42 | 42 | 42 | 42 | 42 | 42 | 42 | 42 |
|       | 56 | 57 | 58 | 59 | 60 | 61 | 62 | 63 | 64 | 65 | 66 | 67 | 68 | 69 | 70~97 | 98 | 99 | 100 | 101 |
| Alt.1 | | | | | | | | | | | | | | | | 4~28 | 4 | 4 | 4 |
| Alt.2 | 42 | 42 | 42 | 42 | 42 | 42 | 42 | 42 | 42 | 42 | 42 | 42 | 42 | 42 | | 28 | 28 | 28 | 28 |

| | xTTI index n | | | | | | | | | |
|---|---|---|---|---|---|---|---|---|---|---|
| | 46 | 47 | 48 | 49 | 50 | 51 | 52 | 53 | 54 | 55 |
| Alt.1 | | | | | | | | | | |
| Alt.2 | 42 | 42 | 42 | 42 | 42 | 42 | 42 | 42 | 42 | 42 |
|       | 102 | 103 | 104 | 105 | 106 | 107 | 108 | 109 | 110 | 111 |
| Alt.1 | | | | | | | | | | |
| Alt.2 | 28 | 28 | 28 | 28 | 28 | 28 | 28 | 28 | 28 | 28 |

| | xTTI index n | | | | | | | | | | | | | |
|---|---|---|---|---|---|---|---|---|---|---|---|---|---|---|
| | 112 | 113 | 114 | 115 | 116 | 117 | 118 | 119 | 120 | 121 | 122 | 123 | 124 | 125 | 126~139 |
| Alt.1 | | | | | | | | | | | | | | | |
| Alt.2 | 28 | 28 | 28 | 28 | 28 | 28 | 28 | 28 | 28 | 28 | 28 | 28 | 28 | 28 | |

Another design avoids potential impacts on legacy UE performance. In this design, HARQ-ACK bits for the PDSCH transmitted in xTTIs within a self-contained DL HARQ-ACK window n are mapped to UL channel that is restricted to subset of GP within self-contained HARQ-ACK window n itself. The channel carrying HARQ-ACK is transparent for legacy UEs.

Figure 6:
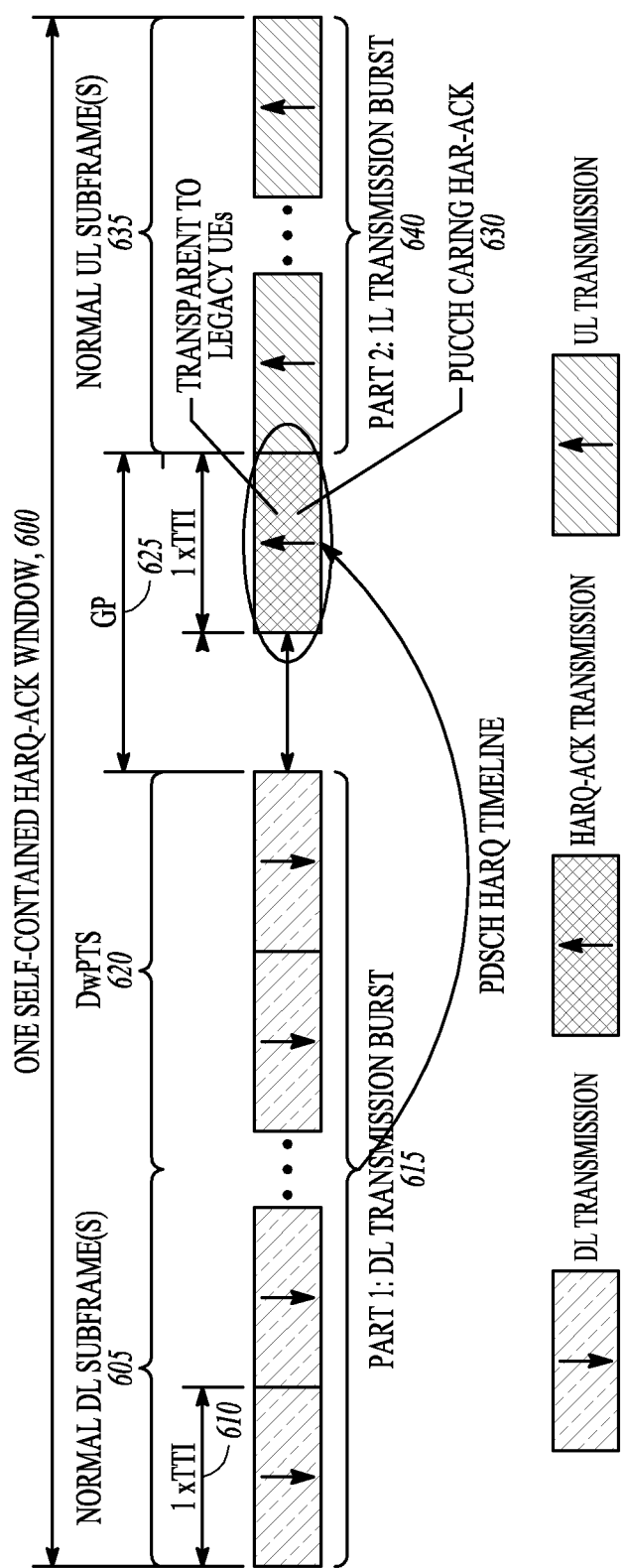
FIG. 6 illustrates a second self-contained hybrid automatic repeat request (HARQ) acknowledgement (ACK) window in accordance with some embodiments.

FIG. 6 illustrates a self-contained HARQ-ACK window 600. Referring to FIG. 6, HARQ-ACK bits for PDSCH in a DL transmission burst 615 of the self-contained HARQ-ACK window 600 are mapped to the PUCCH channel 630, which is restricted as one or more last xTTI(s) of GP 625 of the HARQ-ACK window 600 itself. The number of xTTIs reserved for PUCCHs transmission in GP 625 can be configured by higher layers.

As shown in FIG. 6, the DL transmission burst 615 includes normal DL subframe(s) 605 and DwPTS 620, and is segmented into at least one xTTI 610. The UL transmission burst 640 includes normal UL subframes 635. Within the GP 625, one xTTI includes PUCCH carrying HARQ-ACK 630.

Following the design principle of FIG. 6, if there is PDSCH transmission indicated by the detection of corresponding PDCCH or there is PDCCH indicating downlink SPS release in subframe(s) n–k, where k∈K and K is defined in Table 12 as a set of M element {k₀, k₁, ..., k_{M-1}} depending on subframe n and the UL/DL configuration, UE sends HARQ-ACK in subframe n.

TABLE 12

DL xTTIs set index K: {k₀, k₁, ..., k_{M-1}} for UL/DL configurations 0-6

| Case 1: xTTI = 2 OFDM symbols | | | | | | Case 2: xTTI = 1 OFDM symbol | | | | | |
|---|---|---|---|---|---|---|---|---|---|---|---|
| UL/DL Configuration | 0~12 | 13 | 14~47 | 48 | 49~69 | UL/DL Configuration | 0~26 | 27 | 28~96 | 97 | 98~139 |
| 0 | | 4~13 | | 4~13 | | 0 | | 4~27 | | 4~27 | |
| 1 | | 4~20 | | 4~20 | | 1 | | 4~41 | | 4~41 | |
| 2 | | 4~27 | | 4~27 | | 2 | | 4~55 | | 4~55 | |

TABLE 12-continued

DL xTTIs set index K: {$k_0, k_1, \ldots, k_{M-1}$} for UL/DL configurations 0-6

| | Case 1: xTTI = 2 OFDM symbols | | | | Case 2: xTTI = 1 OFDM symbol | | | | |
|---|---|---|---|---|---|---|---|---|---|
| UL/DL | | xTTI index n | | | UL/DL | | xTTI index n | | |
| Configuration | 0~12 | 13 | 14~47 | 48 | 49~69 | Configuration | 0~26 | 27 | 28~96 | 97 | 98~139 |
| 3 | | 4~48 | | | | 3 | | 4~97 | | | |
| 4 | | 4~55 | | | | 4 | | 4~111 | | | |
| 5 | | 4~62 | | | | 5 | | 4~125 | | | |
| 6 | | 4~20 | | 4~13 | | 6 | | 4~41 | | 4~27 | |

For xTTI with one or two OFDM symbols, the PUSCH scheduling timing and the corresponding HARQ ACK/NACK timing on PHICH are further disclosed in the following to enable PUSCH transmission in xTTIs.

For a TDD UL/DL configuration 1-6, upon detection of a PDCCH with uplink DCI format and/or a PHICH transmission in subframe n intended for the UE, the UE adjusts the corresponding PUSCH transmission in subframe n+k, with k given in Table 13, according to the PDCCH and PHICH information.

For TDD UL/DL configuration 0 and HARQ operation, the UE, upon detection of a PDCCH with uplink DCI format and/or a PHICH transmission in subframe n intended for the UE, adjusts the corresponding PUSCH transmission in subframe n+k if the MSB of the UL index in the DCI format 0 is set to 1 or PHICH is received in subframe n=0-6 in Table 13 or n=0-13 in Table 16 in the resource corresponding to $I_{PHICH}=0$ with the smaller k value of two candidates in Table 13 or 19. Otherwise, the UE adjusts the corresponding PUSCH transmission in subframe n+k if the LSB of the UL index in the DCI format 0 is set to 1 or PHICH is received in subframe n=0-6 in Table 13 or n=0-13 in Table 16 in the resource corresponding to $I_{PHICH}=1$ with the larger k value of two candidates given in Table 13 and 19.

TABLE 13 k for TDD UL/DL configuration 0, 1, 2 with xTTI = 2 OFDM symbols

| UL-DL Configuration | xTTI index n | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14~34 |
| | 35 | 36 | 37 | 38 | 39 | 40 | 41 | 42 | 43 | 44 | 45 | 46 | 47 | 48 | 49~69 |
| 0 | 14, 15 | 15, 16 | 16, 17 | 17, 18 | 18, 19 | 19, 20 | 20, 21 | 21 | 21 | 21 | 21 | 21 | 21 | 21 | |
| 1 | 14 | 14 | 14 | 14 | 14 | 14 | 14 | 14 | 14 | 14 | 14 | 14 | 14 | 14 | |
| 2 | | | | | | | | 7 | 7 | 7 | 7 | 7 | 7 | 7 | |

TABLE 14 k for TDD UL/DL configuration 3, 4, 5 with xTTI = 2 OFDM symbols

| UL-DL Configuration | xTTI index n | | | | | | | | | | | | | | | | | | | | |
|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14~62 | 63 | 64 | 65 | 66 | 67 | 68 | 69 |
| 3 | 21 | 21 | 21 | 21 | 21 | 21 | 21 | 21 | 21 | 21 | 21 | 21 | 21 | 21 | | 21 | 21 | 21 | 21 | 21 | 21 | 21 |
| 4 | 14 | 14 | 14 | 14 | 14 | 14 | 14 | 14 | 14 | 14 | 14 | 14 | 14 | 14 | | | | | | | | |
| 5 | | | | | | | | 7 | 7 | 7 | 7 | 7 | 7 | 7 | | | | | | | | |

TABLE 15 k for TDD UL/DL configuration 6 with xTTI = 2 OFDM symbols

| UL-DL Configuration | xTTI index n | | | | | | | | | | | | | | | | | | | | |
|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21~34 |
| 6 | 21 | 21 | 21 | 21 | 21 | 21 | 21 | 21 | 21 | 21 | 21 | 21 | 21 | 21 | | | | | | | | |

| UL-DL Configuration | xTTI index n | | | | | | | | | | | | | | | | | | | | |
|---|---|---|---|---|---|---|---|---|---|---|---|---|---|---|---|---|---|---|---|---|---|
| | 35 | 36 | 37 | 38 | 39 | 40 | 41 | 42 | 43 | 44 | 45 | 46 | 47 | 48 | 49~62 | 63 | 64 | 65 | 66 | 67 | 68 | 69 |
| 6 | 14 | 14 | 14 | 14 | 14 | 14 | 14 | 14 | 14 | 14 | 14 | 14 | 14 | 14 | | 21 | 21 | 21 | 21 | 21 | 21 | 21 |

TABLE 16 k for TDD UL/DL configuration 0, 1, 2 with xTTI = 1 OFDM symbol

| UL-DL Configuration | xTTI index n | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28~69 |
| | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 | 97 | 98~139 |
| 0 | 28, 29 | 29, 30 | 30, 31 | 31, 32 | 32, 33 | 33, 34 | 34, 35 | 35, 36 | 36, 37 | 37, 38 | 38, 39 | 39, 40 | 40, 41 | 41, 42 | 42 | 42 | 42 | 42 | 42 | 42 | 42 | 42 | 42 | 42 | 42 | 42 | 42 | 42 | |
| 1 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | |
| 2 | | | | | | | | | | | | | | | 14 | 14 | 14 | 14 | 14 | 14 | 14 | 14 | 14 | 14 | 14 | 14 | 14 | 14 | |

TABLE 17 k for TDD UL/DL configuration 3 with xTTI = 1 OFDM symbol

| UL-DL Configuration | xTTI index n | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28~125 |
| 3 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | |

| UL-DL Configuration | xTTI index n | | | | | | | | | | | | | |
|---|---|---|---|---|---|---|---|---|---|---|---|---|---|---|
| | 126 | 127 | 128 | 129 | 130 | 131 | 132 | 133 | 134 | 135 | 136 | 137 | 138 | 139 |
| 3 | 42 | 42 | 42 | 42 | 42 | 42 | 42 | 42 | 42 | 42 | 42 | 42 | 42 | 42 |

TABLE 18 k for TDD UL/DL configuration 4 and 5 with xTTI = 1 OFDM symbol

| UL-DL Configuration | xTTI index n | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28~139 |
| 4 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | |
| 5 | | | | | | | | | | | | | | | 14 | 14 | 14 | 14 | 14 | 14 | 14 | 14 | 14 | 14 | 14 | 14 | 14 | 14 | |

TABLE 19 k for TDD UL/DL configuration 6 with xTTI = 1 OFDM symbol

| UL-DL Configuration | xTTI index n | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28~69 |
| 6 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | 42 | |

TABLE 19-continued k for TDD UL/DL configuration 6 with xTTI = 1 OFDM symbol

| UL-DL Configuration | xTTI index n |||||||||||||||||||||||||||||
|---|---|---|---|---|---|---|---|---|---|---|---|---|---|---|---|---|---|---|---|---|---|---|---|---|---|---|---|---|
| ration | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 | 97 | 98~125 |
| 6 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 | 28 |

| UL-DL Configuration | xTTI index n |||||||||||||
|---|---|---|---|---|---|---|---|---|---|---|---|---|---|
| | 126 | 127 | 128 | 129 | 130 | 131 | 132 | 133 | 134 | 135 | 136 | 137 | 138 | 139 |
| 6 | 42 | 42 | 42 | 42 | 42 | 42 | 42 | 42 | 42 | 42 | 42 | 42 | 42 | 42 |

For PHICH assignment procedure, for scheduled PUSCH transmissions in subframe n, a UE determines the corresponding PHICH resource in subframe n+$k_{PHICH}$, where $k_{PHICH}$ is given in Tables 20-25 for xTTI=1 and 2 OFDM symbols, respectively.

TABLE 20

$k_{PHICH}$ for TDD UL/DL configuration 0, 1, 2 with xTTI = 2 OFDM symbols

| UL-DL Configuration | xTTI index |||||||||||||||||||||||
|---|---|---|---|---|---|---|---|---|---|---|---|---|---|---|---|---|---|---|---|---|---|---|---|
| | 0~13 | 14 | 15 | 16 | 17 | 18 | 19 | 20 | 21 | 22 | 23 | 24 | 25 | 26 | 27 | 28 | 29 | 30 | 31 | 32 | 33 | 34 |
| | 35~48 | 49 | 50 | 51 | 52 | 53 | 54 | 55 | 56 | 57 | 58 | 59 | 60 | 61 | 62 | 63 | 64 | 65 | 66 | 67 | 68 | 69 |
| 0 | | 21 | 20 | 20 | 19 | 19 | 18 | 18 | 17 | 17 | 16 | 16 | 15 | 15 | 14 | 14 | 14 | 14 | 14 | 14 | 14 | 14 |
| 1 | | 21 | 21 | 21 | 21 | 21 | 21 | 21 | 21 | 21 | 21 | 21 | 21 | 21 | 21 | | | | | | | |
| 2 | | 28 | 28 | 28 | 28 | 28 | 28 | 28 | | | | | | | | | | | | | | |

TABLE 21

$k_{PHICH}$ for TDD UL/DL configuration 3, 4, 5 with xTTI = 2 OFDM symbols

| UL-DL Configuration | xTTI index ||||||||||||||||||||||||
|---|---|---|---|---|---|---|---|---|---|---|---|---|---|---|---|---|---|---|---|---|---|---|---|
| | 0~13 | 14 | 15 | 16 | 17 | 18 | 19 | 20 | 21 | 22 | 23 | 24 | 25 | 26 | 27 | 28 | 29 | 30 | 31 | 32 | 33 | 34 | 35~69 |
| 3 | | 49 | 49 | 49 | 49 | 49 | 49 | 49 | 49 | 49 | 49 | 49 | 49 | 49 | 49 | 49 | 49 | 49 | 49 | 49 | 49 | 49 | |
| 4 | | 56 | 56 | 56 | 56 | 56 | 56 | 56 | 56 | 56 | 56 | 56 | 56 | 56 | 56 | | | | | | | | |
| 5 | | 63 | 63 | 63 | 63 | 63 | 63 | 63 | | | | | | | | | | | | | | | |

TABLE 22

$k_{PHICH}$ for TDD UL/DL configuration 6 with xTTI = 2 OFDM symbols

| UL-DL Configuration | xTTI index |||||||||||||||||||||
|---|---|---|---|---|---|---|---|---|---|---|---|---|---|---|---|---|---|---|---|---|---|
| | 0~13 | 14 | 15 | 16 | 17 | 18 | 19 | 20 | 21 | 22 | 23 | 24 | 25 | 26 | 27 | 28 | 29 | 30 | 31 | 32 | 33 | 34 |
| 6 | | 21 | 21 | 21 | 21 | 21 | 21 | 21 | 21 | 21 | 21 | 21 | 21 | 21 | 35 | 35 | 35 | 35 | 35 | 35 | 35 | 35 |

| UL-DL Configuration | xTTI index |||||||||||||||||||||
|---|---|---|---|---|---|---|---|---|---|---|---|---|---|---|---|---|---|---|---|---|---|
| | 35~48 | 49 | 50 | 51 | 52 | 53 | 54 | 55 | 56 | 57 | 58 | 59 | 60 | 61 | 62 | 63 | 64 | 65 | 66 | 67 | 68 | 69 |
| 6 | | 21 | 21 | 21 | 21 | 21 | 21 | 21 | 21 | 21 | 21 | 21 | 21 | 21 | | | | | | | | |

TABLE 23

$k_{PHICH}$ for TDD UL/DL configuration 0, 1, 2 with xTTI = 1 OFDM symbol

| UL/DL Configuration | xTTI index | | | | | | | | | |
|---|---|---|---|---|---|---|---|---|---|---|
| | 0~27 (70~97) | 28 (98) | 29 (99) | 30 (100) | 31 (101) | 32 (102) | 33 (103) | 34 (104) | 35 (105) | 36 (106) | 37 (107) |
| 0 | | 42 | 41 | 41 | 40 | 40 | 39 | 39 | 38 | 38 | 37 |
| 1 | | 42 | 42 | 42 | 42 | 42 | 42 | 42 | 42 | 42 | 42 |
| 2 | | 56 | 56 | 56 | 56 | 56 | 56 | 56 | 56 | 56 | 56 |

| UL/DL Configuration | xTTI index | | | | | | | | | |
|---|---|---|---|---|---|---|---|---|---|---|
| | 38 (108) | 39 (109) | 40 (110) | 41 (111) | 42 (112) | 43 (113) | 44 (114) | 45 (115) | 46 (116) | 47 (117) | 48 (118) |
| 0 | 37 | 36 | 36 | 35 | 35 | 34 | 34 | 33 | 33 | 32 | 32 |
| 1 | 42 | 42 | 42 | 42 | 42 | 42 | 42 | 42 | 42 | 42 | 42 |
| 2 | 56 | 56 | 56 | 56 | | | | | | | |

| UL/DL Configuration | xTTI index | | | | | | | | | |
|---|---|---|---|---|---|---|---|---|---|---|
| | 49 (119) | 50 (120) | 51 (121) | 52 (122) | 53 (123) | 54 (124) | 55 (125) | 56 (126) | 57 (127) | 58 (128) | 59 (129) |
| 0 | 31 | 31 | 30 | 30 | 29 | 29 | 28 | 28 | 28 | 28 | 28 |
| 1 | 42 | 42 | 42 | 42 | 42 | 42 | 42 | | | | |
| 2 | | | | | | | | | | | |

| UL/DL Configuration | xTTI index | | | | | | | | | |
|---|---|---|---|---|---|---|---|---|---|---|
| | 60 (130) | 61 (131) | 62 (132) | 63 (133) | 64 (134) | 65 (135) | 66 (136) | 67 (137) | 68 (138) | 69 (139) |
| 0 | 28 | 28 | 28 | 28 | 28 | 28 | 28 | 28 | 28 | 28 |
| 1 | | | | | | | | | | |
| 2 | | | | | | | | | | |

TABLE 24

$k_{PHICH}$ for TDD UL/DL configuration 3, 4, 5 with xTTI = 1 OFDM symbol

| UL/DL Configuration | xTTI index | | | | | | | | | | |
|---|---|---|---|---|---|---|---|---|---|---|---|
| | 0~27 | 28 | 29 | 30 | 31 | 32 | 33 | 34 | 35 | 36 | 37 | 38 |
| 3 | | 98 | 98 | 98 | 98 | 98 | 98 | 98 | 98 | 98 | 98 | 98 |
| 4 | | 112 | 112 | 112 | 112 | 112 | 112 | 112 | 112 | 112 | 112 | 112 |
| 5 | | 126 | 126 | 126 | 126 | 126 | 126 | 126 | 126 | 126 | 126 | 126 |

| UL/DL Configuration | xTTI index | | | | | | | | | |
|---|---|---|---|---|---|---|---|---|---|---|
| | 39 | 40 | 41 | 42 | 43 | 44 | 45 | 46 | 47 | 48 |
| 3 | 98 | 98 | 98 | 98 | 98 | 98 | 98 | 98 | 98 | 98 |
| 4 | 112 | 112 | 112 | 112 | 112 | 112 | 112 | 112 | 112 | 112 |
| 5 | 126 | 126 | 126 | | | | | | | |

| UL/DL Configuration | xTTI index | | | | | | | | | | |
|---|---|---|---|---|---|---|---|---|---|---|---|
| | 49 | 50 | 51 | 52 | 53 | 54 | 55 | 56 | 57 | 58 | 59 | 60 |
| 3 | 98 | 98 | 98 | 98 | 98 | 98 | 98 | 98 | 98 | 98 | 98 | 98 |
| 4 | 112 | 112 | 112 | 112 | 112 | 112 | 112 | | | | | |
| 5 | | | | | | | | | | | | |

| UL/DL Configuration | xTTI index | | | | | | | | | |
|---|---|---|---|---|---|---|---|---|---|---|
| | 61 | 62 | 63 | 64 | 65 | 66 | 67 | 68 | 69 | 70~139 |
| 3 | 98 | 98 | 98 | 98 | 98 | 98 | 98 | 98 | 98 | |
| 4 | | | | | | | | | | |
| 5 | | | | | | | | | | |

TABLE 25

$k_{PHICH}$ for TDD UL/DL configuration 6 with xTTLI = 1 OFDM symbol

| UL/DL | xTTI index | | | | | | | | | | | | | |
|---|---|---|---|---|---|---|---|---|---|---|---|---|---|---|
| Configuration | 0~27 | 28 | 29 | 30 | 31 | 32 | 33 | 34 | 35 | 36 | 37 | 38 | 39 | 40 | 41 |
| | | 42 | 42 | 42 | 42 | 42 | 42 | 42 | 42 | 42 | 42 | 42 | 42 | 42 | 42 |

| UL/DL | xTTI index | | | | | | | | | | | | |
|---|---|---|---|---|---|---|---|---|---|---|---|---|---|
| Configuration | 42 | 43 | 44 | 45 | 46 | 47 | 48 | 49 | 50 | 51 | 52 | 53 | 54 | 55 |
| | 42 | 42 | 42 | 42 | 42 | 42 | 42 | 42 | 42 | 42 | 42 | 42 | 42 | 42 |

| UL/DL | xTTI index | | | | | | | | | | | | |
|---|---|---|---|---|---|---|---|---|---|---|---|---|---|
| Configuration | 56 | 57 | 58 | 59 | 60 | 61 | 62 | 63 | 64 | 65 | 66 | 67 | 68 | 69 | 70~97 |
| | 70 | 70 | 70 | 70 | 70 | 70 | 70 | 70 | 70 | 70 | 70 | 70 | 70 | 70 | |

| UL/DL | xTTI index | | | | | | | | | | | | |
|---|---|---|---|---|---|---|---|---|---|---|---|---|---|
| Configuration | 98 | 99 | 100 | 101 | 102 | 103 | 104 | 105 | 106 | 107 | 108 | 109 | 110 | 111 |
| | 42 | 42 | 42 | 42 | 42 | 42 | 42 | 42 | 42 | 42 | 42 | 42 | 42 | 42 |

| UL/DL | xTTI index | | | | | | | | | | | | |
|---|---|---|---|---|---|---|---|---|---|---|---|---|---|
| Configuration | 112 | 113 | 114 | 115 | 116 | 117 | 118 | 119 | 120 | 121 | 122 | 123 | 124 | 125 | 126~139 |

Figure 7:
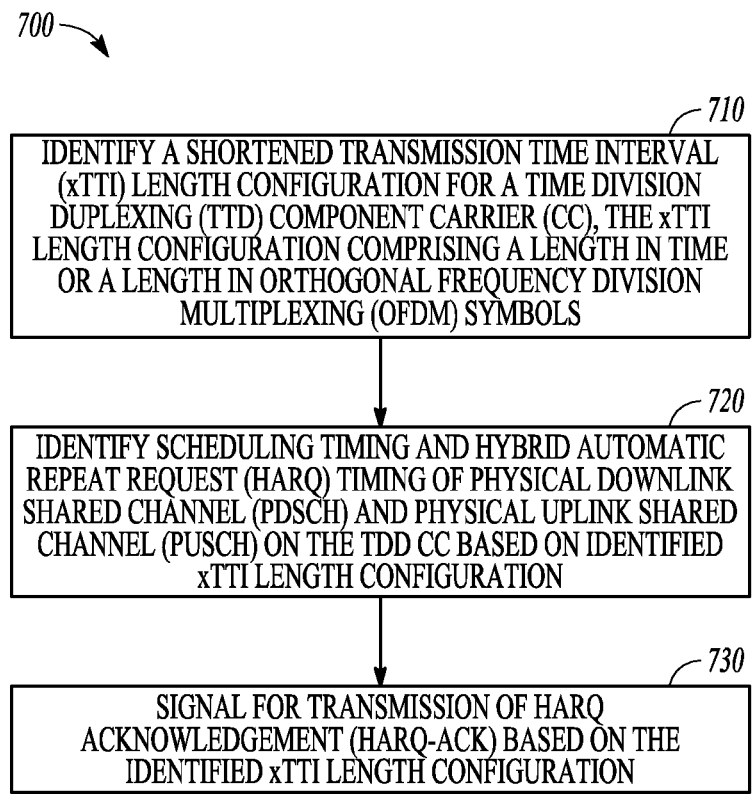
FIG. 7 is a flow chart of an example method for latency reduction in accordance with some embodiments.

FIG. 7 is a flow chart of an example method 700 for latency reduction in accordance with some embodiments.

The method 700 begins at operation 710, where UE (e.g., UE 802 of FIG. 8) identifies a shortened transmission time interval (xTTI) length configuration for a time division duplexing (TDD) component carrier (CC), the xTTI length configuration comprising a length in time or a length in orthogonal frequency division multiplexing (OFDM) symbols.

At operation 720, the UE identifies scheduling timing and hybrid automatic repeat request (HARQ) timing of physical downlink shared channel (PDSCH) and physical uplink shared channel (PUSCH) on the TDD CC based on the identified xTTI length configuration.

At operation 730, the UE signals for transmission of HARQ acknowledgement (HARQ-ACK) based on the identified xTTI length configuration.

Figure 8:
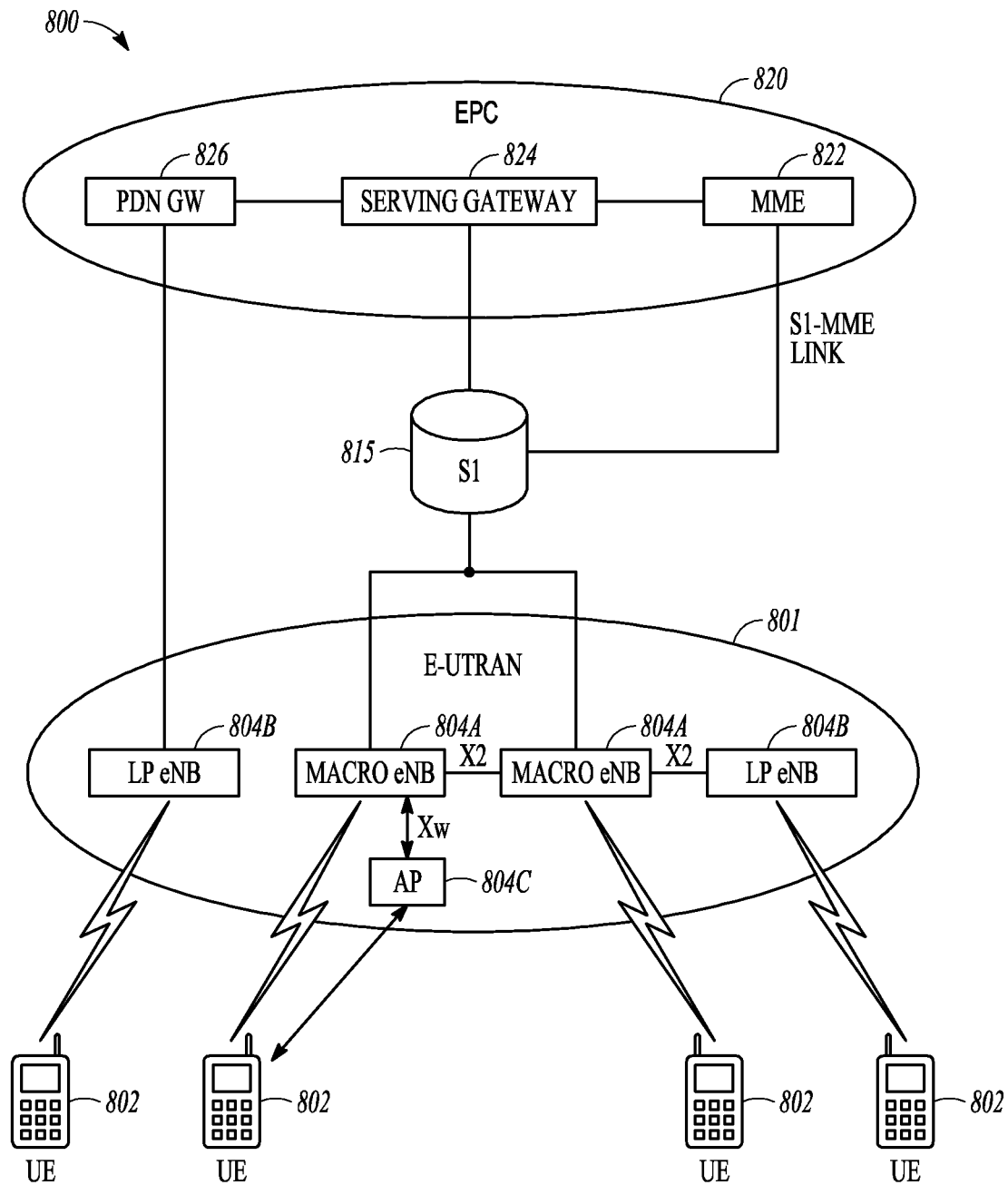
FIG. 8 is a functional diagram of a wireless network in accordance with some embodiments.

FIG. 8 shows an example of a portion of an end-to-end network architecture of a Long Term Evolution (LTE) network 800 with various components of the network in accordance with some embodiments. As used herein, an LTE network refers to both LTE and LTE Advanced (LTE-A) networks as well as other versions of LTE networks to be developed. The network 800 may comprise a radio access network (RAN) (e.g., as depicted, the E-UTRAN or evolved universal terrestrial radio access network) 801 and core network 820 (e.g., shown as an evolved packet core (EPC)) coupled together through an S interface 815. For convenience and brevity, only a portion of the core network 820, as well as the RAN 801, is shown in the example. The network 800 includes the UE 802, which is configured to select an eNB Tx beam in a 5G eNB based on BRS measurements; transmit a PRACH or SR on a dedicated resource allocated by a LTE eNB; transmit a report indicating the selected eNB Tx beam in the 5G eNB via a PUSCH or PUCCH in the LTE eNB; receive a PDCCH order from the LTE eNB or a xPDCCH order from the 5G eNB for triggering a xPRACH transmission in the 5G eNB; and transmit xPRACH on a resource indicated in the received PDCCH or xPDCCH order in the 5G eNB.

The core network 820 may include a mobility management entity (MME) 822, serving gateway (serving GW) 824, and packet data network gateway (PDN GW) 826. The RAN 801 may include evolved node Bs (eNBs) 804 (which may operate as base stations) for communicating with user equipment (UE) 802. The eNBs 804 may include macro eNBs 804a and low power (LP) eNBs 804b. The UEs 802 may implement the method 700 of FIG. 7.

The MME 822 may be similar in function to the control plane of legacy Serving GPRS Support Nodes (SGSN). The MME 822 may manage mobility aspects in access such as gateway selection and tracking area list management. The serving GW 824 may terminate the interface toward the RAN 801, and route data packets between the RAN 801 and the core network 820. In addition, the serving GW 824 may be a local mobility anchor point for inter-eNB handovers and also may provide an anchor for inter-3GPP mobility. Other responsibilities may include lawful intercept, charging, and some policy enforcement. The serving GW 824 and the MME 822 may be implemented in one physical node or separate physical nodes.

The PDN GW 826 may terminate a SGi interface toward the packet data network (PDN). The PDN GW 826 may route data packets between the EPC 820 and the external PDN, and may perform policy enforcement and charging data collection. The PDN GW 826 may also provide an anchor point for mobility devices with non-LTE access. The external PDN can be any kind of IP network, as well as an IP Multimedia Subsystem (IMS) domain. The PDN GW 826 and the serving GW 824 may be implemented in a single physical node or separate physical nodes.

The eNBs 804 (macro and micro) may terminate the air interface protocol and may be the first point of contact for a UE 802. In some embodiments, an eNB 804 may fulfill various logical functions for the RAN 801 including, but not limited to, RNC (radio network controller functions) such as radio bearer management, uplink and downlink dynamic radio resource management and data packet scheduling, and mobility management. In accordance with embodiments, UEs 802 may be configured to communicate orthogonal frequency division multiplexed (OFDM) communication signals with an eNB 804 over a multicarrier communication channel in accordance with an OFDMA communication technique. The OFDM signals may comprise a plurality of orthogonal subcarriers.

The S1 interface 815 may be the interface that separates the RAN 801 and the EPC 820. It may be split into two parts: the S1-U, which may carry traffic data between the eNBs 804 and the serving GW 824, and the S1-MME, which may be a signaling interface between the eNBs 804 and the MME 822. The X2 interface may be the interface between eNBs 804. The X2 interface may comprise two parts, the X2-C and X2-U. The X2-C may be the control plane interface between the eNBs 804, while the X2-U may be the user plane interface between the eNBs 804.

With cellular networks. LP cells 804b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 804b might be a femtocell eNB since it is coupled through the PDN GW 826. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 804a via an X2 interface. Picocell eNBs or other LP eNBs LP eNB 804b may incorporate some or all functionality of a macro eNB LP eNB 804a. In some cases, this may be referred to as an access point base station or enterprise femtocell.

In some embodiments, the UE 802 may communicate with an access point (AP) 804c. The AP 804c may use only the unlicensed spectrum (e.g., WiFi bands) to communicate with the UE 802. The AP 804c may communicate with the macro eNB 804A (or LP eNB 804B) through an Xw interface. In some embodiments, the AP 804c may communicate with the UE 802 independent of communication between the UE 802 and the macro eNB 804A. In other embodiments, the AP 804c may be controlled by the macro eNB 804A and use LWA, as described in more detail below.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 OFDM symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols)= 168 resource elements.

Each OFDM symbol may contain a cyclic prefix (CP) which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 9:
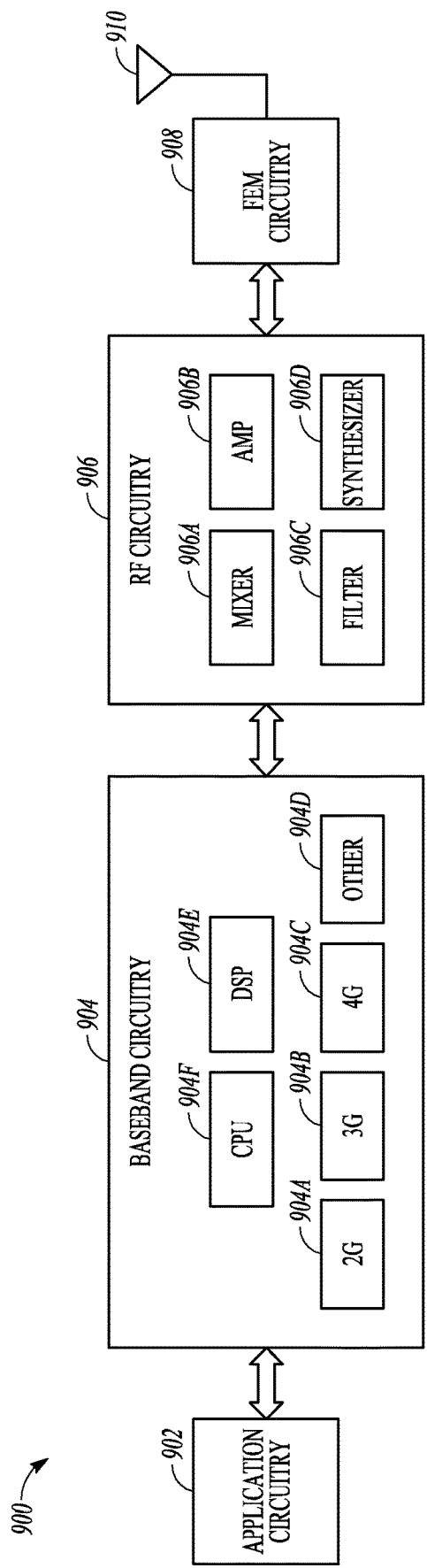
FIG. 9 illustrates components of a communication device in accordance with some embodiments.

Embodiments described herein may be implemented into a system using any suitably configured hardware and/or software. FIG. 9 illustrates components of a UE in accordance with some embodiments. At least some of the components shown may be used in an eNB or MME, for example, such as the UE 802 or eNB 804 shown in FIG. 8, or a UE that implements the method 700 of FIG. 7. The UE 900 and other components may be configured to use the synchronization signals as described herein. The UE 900 may be a stationary, non-mobile device or may be a mobile device. In some embodiments, the UE 900 may include application circuitry 902, baseband circuitry 904, Radio Frequency (RF) circuitry 906, front-end module (FEM) circuitry 908 and one or more antennas 910, coupled together at least as shown. At least some of the baseband circuitry 904, RF circuitry 906, and FEM circuitry 908 may form a transceiver. In some embodiments, other network elements, such as the eNB may contain some or all of the components shown in FIG. 9. Other of the network elements, such as the MME, may contain an interface, such as the S1 interface, to communicate with the eNB over a wired connection regarding the UE.

The application or processing circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include FFT, precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE). GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE 900 may include additional elements such as, for example, memory/storage, display, camera, sensor, and/or input/output (I/O) interface as described in more detail below. In some embodiments, the UE 900 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 900 may include one or more user interfaces designed to enable user interaction with the system and/or peripheral component interfaces designed to enable peripheral component interaction with the system. For example, the UE 900 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 910 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 910 may be effectively separated to take advantage of spatial diversity and the different channel characteristics that may result.

Although the UE 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 10:
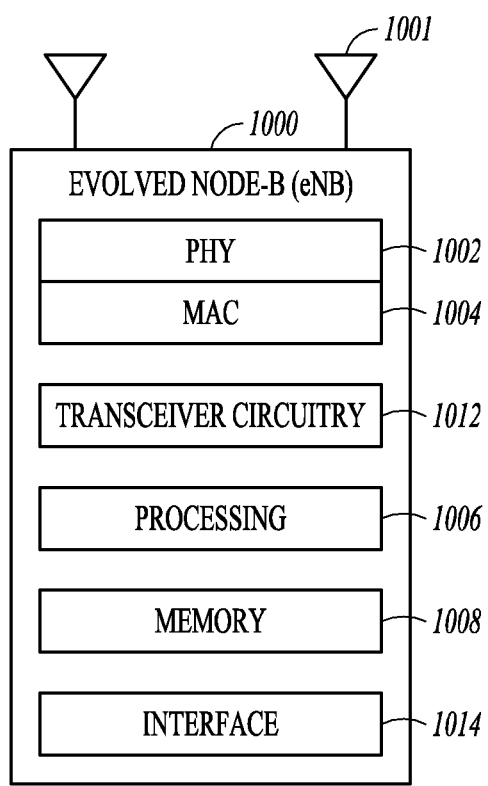
FIG. 10 illustrates a block diagram of a communication device in accordance with some embodiments.

FIG. 10 is a block diagram of a communication device in accordance with some embodiments. The device may be a UE or eNB, for example, such as the UE 802 or eNB 804 shown in FIG. 8. The physical layer circuitry 1002 may perform various encoding and decoding functions that may include formation of baseband signals for transmission and decoding of received signals. The communication device 1000 may also include medium access control layer (MAC) circuitry 1004 for controlling access to the wireless medium. The communication device 1000 may also include processing circuitry 1006, such as one or more single-core or multi-core processors, and memory 1008 arranged to perform the operations described herein. The physical layer circuitry 1002, MAC circuitry 1004 and processing circuitry 1006 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 1000 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 1000 may include transceiver circuitry 1012 to enable communication with other external devices wirelessly and interfaces 1014 to enable wired communication with other external devices. As another example, the transceiver circuitry 1012 may perform various transmission and reception functions such as conversion of signals between a baseband range and a Radio Frequency (RF) range.

The antennas 1001 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 1001 may be effectively separated to take advantage of spatial diversity and the different channel characteristics that may result.

Although the communication device 1000 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 11:
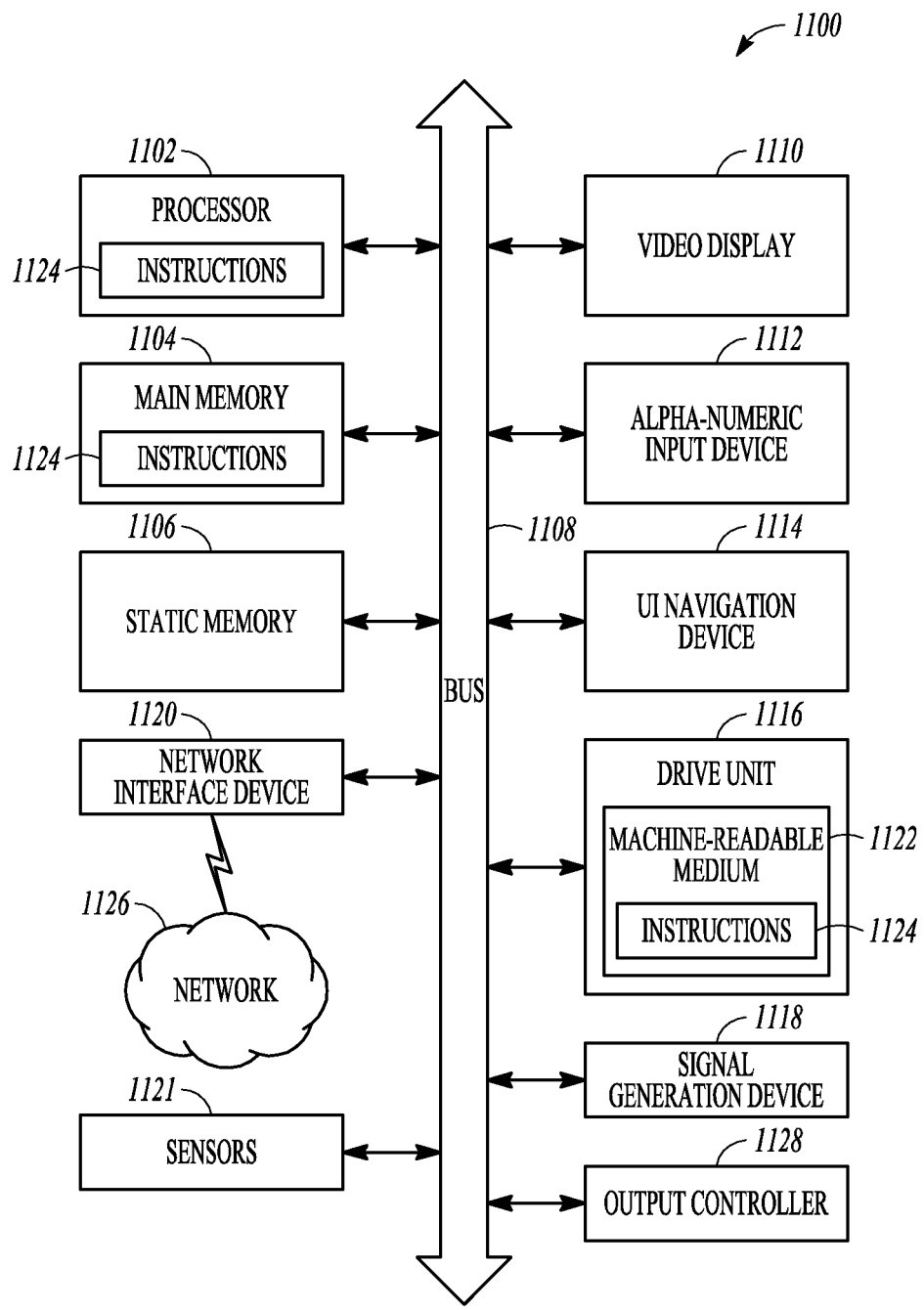
FIG. 11 illustrates another block diagram of a communication device in accordance with some embodiments.

FIG. 11 illustrates another block diagram of a communication device 1100 in accordance with some embodiments. The communication device 1100 may correspond to the UE 802 or the eNB 804. In alternative embodiments, the communication device 1100 may operate as a standalone device or may be connected (e.g., networked) to other communication devices. In a networked deployment, the communication device 1100 may operate in the capacity of a server communication device, a client communication device, or both in server-client network environments. In an example, the communication device 1100 may act as a peer communication device in peer-to-peer (P2P) (or other distributed) network environment. The communication device 1100 may be a UE, eNB. PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The communication device 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The communication device 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The communication device 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a communication device readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the communication device 1100. In an example, one or any combination of the hardware processor 1102, the main memory 1104, the static memory 1106, or the storage device 1116 may constitute communication device readable media.

While the communication device readable medium 1122 is illustrated as a single medium, the term "communication device readable medium" may include a single medium or multiple media (e.g., a centralized or distributed database, and/or associated caches and servers) configured to store the one or more instructions 1124.

The term "communication device readable medium" may include any medium that is capable of storing, encoding, or carrying instructions for execution by the communication device 1100 and that cause the communication device 1100 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks, magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), MIMO, or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the communication device 1100, and includes digital or analog communications signals or other intangible medium to facilitate communication of such software.

The subject technology is described below in conjunction with various examples.

Example 1 is an apparatus of a user equipment (UE), the apparatus comprising: processing circuitry and memory, the processing circuitry to configure the UE to: identify a shortened transmission time interval (xTTI) length configuration for a time division duplexing (TDD) component carrier (CC), the xTTI length configuration comprising a length in time or a length in orthogonal frequency division multiplexing (OFDM) symbols; identify scheduling timing and hybrid automatic repeat request (HARQ) timing of physical downlink shared channel (PDSCH) and physical uplink shared channel (PUSCH) on the TDD CC based on the identified xTTI length configuration; and signal for transmission of HARQ acknowledgement (HARQ-ACK) to an evolved NodeB (eNB) based on a HARQ-ACK timeline and based on the identified xTTI length configuration.

In Example 2, the subject matter of Example 1 optionally includes transceiver circuitry to transmit the HARQ-ACK to the eNB based on the HARQ-ACK timeline and based on the identified xTTI length configuration.

In Example 3, the subject matter of Example 1 optionally includes an antenna coupled with the transceiver circuitry.

In Example 4, the subject matter of any of Examples 1-2 optionally includes that the identified xTTI length configuration is 0.5 milliseconds.

In Example 5, the subject matter of any of Examples 1-2 optionally includes that the identified length configuration is one or two OFDM symbols.

In Example 6, the subject matter of any of Examples 1-2 optionally includes that a single downlink control channel transmitted in a single xTTI schedules a single PDSCH transmission in the single xTTI.

In Example 7, the subject matter of any of Examples 1-2 optionally includes that the scheduling timing comprises a downlink control information (DCI) format that includes an information element (IE) representing by a first number of bits and indicating a set of xTTI indexes for a corresponding downlink or uplink data transmission.

In Example 8, the subject matter of any of Examples 1-2 optionally includes that the processing circuitry is further to: signal for transmission of HARQ acknowledgement (HARQ-ACK) to the evolved NodeB for a set of PDSCHs in a set of available xTTIs.

In Example 9, the subject matter of Example 8 optionally includes that the processing circuitry is further to encode for transmission of HARQ-ACK for a PDSCH in a xTTI n in a first available uplink xTTI after n+k xTTIs, wherein a value of n is fixed in a specification, and wherein a value of k is fixed in the specification, indicated by a downlink control information (DCI) format, or configured by higher layers.

In Example 10, the subject matter of Example 8 optionally includes that the processing circuitry is further to encode for even transmission of HARQ-ACK for the set of PDSCHs in a set of available uplink xTTIs after k xTTIs, wherein a value of k is fixed in a specification, indicated by a downlink control information (DCI) format, or configured by higher layers.

In Example 11, the subject matter of any of Examples 1-2 optionally includes that the processing circuitry is further to: determine a self-contained HARQ-ACK window in xTTI, the self-contained window comprising a downlink transmission burst period, a guard period (GP), and an uplink transmission period; and signal for transmission of HARQ-ACK bits for PDSCH in the downlink transmission burst period, the GP, or the uplink transmission period of the HARQ-ACK window.

In Example 12, the subject matter of Example 11 optionally includes that HARQ-ACK bits for one or more PDSCHs in the self-contained HARQ-ACK window are transmitted within a subset of the GP in the self-contained HARQ-ACK window.

In Example 13, the subject matter of Example 11 optionally includes that HARQ-ACK bits for one or more PDSCHs in the self-contained HARQ-ACK window are transmitted in a first available uplink xTTI after n+k xTTIs in the self-contained HARQ-ACK window, wherein a value of n is fixed in a specification, and wherein a value of k is fixed in the specification, indicated by a downlink control information (DCI) format, or configured by higher layers.

In Example 14, the subject matter of Example 11 optionally includes that HARQ-ACK bits for one or more PDSCHs in the self-contained HARQ-ACK window are transmitted in a set of available uplink xTTIs after k xTTIs in the self-contained HARQ-ACK window, wherein a value of k is fixed in a specification, indicated by a downlink control information (DCI) format, or configured by higher layers.

In Example 15, the subject matter of Example 11 optionally includes that the processing circuitry is further to: configure the self-contained window based on at least a time division duplex (TDD) uplink/downlink (UL/DL) configuration broadcasted by higher layers, wherein the xTTI length is configured by higher layers or indicated by a downlink control information (DCI) format.

In Example 16, the subject matter of Example 15 optionally includes that a DL transmission period comprises a duration reserved for downlink transmission between two consecutive uplink pilot time slots (UpPTS); GP is signaled based on the UL/DL configuration; and a UL transmission period comprises a duration reserved for UL transmission between two consecutive downlink pilot time slots (DwPTS).

In Example 17, the subject matter of any of Examples 1-2 optionally includes that the processing circuitry comprises a baseband processor.

Example 18 is an apparatus of a user equipment (UE), the apparatus comprising: processing circuitry and memory, the processing circuitry to: identify a shortened transmission time interval (xTTI) length configuration for a time division duplexing (TDD) component carrier (CC), the xTTI length configuration comprising a length in time or a length in orthogonal frequency division multiplexing (OFDM) symbols; identify scheduling timing and hybrid automatic repeat request (HARQ) timing of physical downlink shared channel (PDSCH) and physical uplink shared channel (PUSCH) on the TDD CC based on the identified xTTI length configuration; and signal for transmission of HARQ acknowledgement (HARQ-ACK) based on the identified xTTI length configuration.

In Example 19, the subject matter of Example 18 optionally includes that the processing circuitry is further to: signal for transmission of the HARQ-ACK to an evolved NodeB (eNB) based on a HARQ-ACK timeline.

In Example 20, the subject matter of Example 18 optionally includes transceiver circuitry to transmit the HARQ-ACK based on the identified xTTI length configuration.

In Example 21, the subject matter of Example 20 optionally includes an antenna coupled with the transceiver circuitry.

In Example 22, the subject matter of Example 18 optionally includes that the identified xTTI length configuration is shorter than one millisecond.

In Example 23, the subject matter of Example 18 optionally includes that the identified length configuration is one or two OFDM symbols.

In Example 24, the subject matter of Example 18 optionally includes that a single downlink control channel schedules a single PDSCH transmission in a single xTTI.

In Example 25, the subject matter of Example 18 optionally includes that the scheduling timing comprises a downlink control information (DCI) format that includes an information element (IE) representing by a first number of bits and indicating a set of TTI indexes for a corresponding downlink or uplink data transmission.

In Example 26, the subject matter of Example 18 optionally includes that the processing circuitry is further to: signal for transmission of HARQ acknowledgement (HARQ-ACK) to the evolved NodeB for a set of PDSCHs in a set of available xTTIs.

In Example 27, the subject matter of Example 18 optionally includes that the processing circuitry is further to: determine a self-contained HARQ-ACK window in xTTI the self-contained window comprising a downlink transmission burst period, a guard period (GP), and an uplink transmission period; and signal for transmission of HARQ-ACK bits for PDSCH in the downlink transmission burst period, the GP, or the uplink transmission period of the HARQ-ACK window.

In Example 28, the subject matter of Example 27 optionally includes that the processing circuitry is further to: configure the self-contained window based on a time division duplex (TDD) uplink/downlink (UL/DL) configuration broadcasted by higher layers.

Example 29 is a non-transitory machine-readable medium comprising instructions that, when executed by one or more processors of a machine, cause the one or more processors to: identify a shortened transmission time interval (xTTI) length configuration for a time division duplexing (TDD) component carrier (CC), the xTTI length configuration comprising a length in time or a length in orthogonal frequency division multiplexing (OFDM) symbols; identify scheduling timing and hybrid automatic repeat request (HARQ) timing of physical downlink shared channel (PDSCH) and physical uplink shared channel (PUSCH) on the TDD CC based on the identified xTTI length configuration; and signal for transmission of HARQ acknowledgement (HARQ-ACK) based on the identified xTTI length configuration.

Example 30 is an apparatus of a user equipment (UE), the apparatus comprising: means for identifying a shortened transmission time interval (xTTI) length configuration for a time division duplexing (TDD) component carrier (CC), the xTTI length configuration comprising a length in time or a length m orthogonal frequency division multiplexing (OFDM) symbols; means for identifying scheduling timing and hybrid automatic repeat request (HARQ) timing of physical downlink shared channel (PDSCH) and physical uplink shared channel (PUSCH) on the TDD CC based on the identified xTTI length configuration; and means for signaling for transmission of HARQ acknowledgement (HARQ-ACK) based on the identified xTTI length configuration.

Although an embodiment has been described with reference to specific example embodiments, it will be evident that various modifications and changes may be made to these embodiments. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third." etc. are used merely as labels, and are not intended to impose numerical requirements on their objects.

The following claims are hereby incorporated into the detailed description, with each claim standing on its own as a separate embodiment.

What is claimed is:

1. An apparatus of a user equipment (UE), the apparatus comprising:
   processing circuitry and memory, the processing circuitry to:
   decode downlink control information that signals a shortened transmission time interval (xTTI) length configuration for a time division duplexing (TDD) component carrier (CC), the xTTI length configuration comprising a length in time or a length in orthogonal frequency division multiplexing (OFDM) symbols;
   decode a physical downlink control channel (PDCCH) to identify scheduling timing and hybrid automatic repeat request (HARQ) timing of a physical downlink shared channel (PDSCH) and physical uplink shared channel (PUSCH) on the TDD CC based on the identified xTTI length configuration, the PDCCH scheduling a PDSCH in a single xTTI; and encode a HARQ acknowledgement (HARQ-ACK) for transmission to an evolved NodeB (eNB) based at least on a HARQ-ACK timeline and based on the identified xTTI length configuration, the HARQ-ACK for the PDSCH being encoded for transmission in a next uplink xTTI, wherein prior to receipt of the downlink control information signalling the xTTI length configuration, the UE was configured to use a legacy TTI length configuration, the xTTI length configuration being half the legacy TTI length configuration.

2. The apparatus of claim 1, further comprising:
transceiver circuitry to transmit the HARQ-ACK to the eNB based at least on the HARQ-ACK timeline and based on the identified xTTI length configuration.

3. The apparatus of claim 2, further comprising:
an antenna coupled with the transceiver circuitry.

4. The apparatus of claim 1, wherein the identified xTTI length configuration is 0.5 milliseconds.

5. The apparatus of claim 1, wherein the identified length configuration is one or two OFDM symbols.

6. The apparatus of claim 1, wherein a single downlink control channel transmitted in a single xTTI schedules a single PDSCH transmission in the single xTTI.

7. The apparatus of claim 1, wherein the scheduling timing comprises a downlink control information (DCI) format that includes an information element (IE) representing by a first number of bits and indicating a set of xTTI indexes for a corresponding downlink or uplink data transmission.

8. The apparatus of claim 1, wherein the processing circuitry is further to:
signal for transmission of the HARQ acknowledgement (HARQ-ACK) to the evolved NodeB for a set of PDSCHs in a set of available xTTIs.

9. The apparatus of claim 8, wherein the processing circuitry is further to:
encode for transmission of the HARQ-ACK for a PDSCH in a xTTI n in a first available uplink xTTI after n+k xTTIs, wherein a value of n is fixed, and wherein a value of k is fixed, indicated by a downlink control information (DCI) format, or configured by higher layers.

10. The apparatus of claim 8, wherein the processing circuitry is further to:
encode for transmission of the HARQ-ACK for the set of PDSCHs in a set of available uplink xTTIs after k xTTIs, wherein a value of k is fixed, indicated by a downlink control information (DCI) format, or configured by higher layers.

11. The apparatus of claim 1, wherein the processing circuitry is further to:
determine a self-contained HARQ-ACK window in xTTI, the self-contained window comprising a downlink transmission burst period, a guard period (GP), and an uplink transmission period; and
signal for transmission of HARQ-ACK bits for PDSCH in the downlink transmission burst period, the GP, or the uplink transmission period of the HARQ-ACK window.

12. The apparatus of claim 11, wherein HARQ-ACK bits for one or more PDSCHs in the self-contained HARQ-ACK window are transmitted within a subset of the GP in the self-contained HARQ-ACK window.

13. The apparatus of claim 11, wherein HARQ-ACK bits for one or more PDSCHs in the self-contained HARQ-ACK window are transmitted in a first available uplink xTTI after n+k xTTIs in the self-contained HARQ-ACK window, wherein a value of n is fixed, and wherein a value of k is fixed, indicated by a downlink control information (DCI) format, or configured by higher layers.

14. The apparatus of claim 11, wherein HARQ-ACK bits for one or more PDSCHs in the self-contained HARQ-ACK window are transmitted in a set of available uplink xTTIs after k xTTIs in the self-contained HARQ-ACK window, wherein a value of k is fixed, indicated by a downlink control information (DCI) format, or configured by higher layers.

15. The apparatus of claim 1, wherein the processing circuitry comprises a baseband processor.

16. An apparatus of a user equipment (UE), the apparatus comprising:
processing circuitry and memory, the processing circuitry to:
identify a shortened transmission time interval (xTTI) length configuration for a time division duplexing (TDD) component carrier (CC), the xTTI length configuration comprising a length in time or a length in orthogonal frequency division multiplexing (OFDM) symbols;
identify scheduling timing and hybrid automatic repeat request (HARQ) timing of a physical downlink shared channel (PDSCH) and physical uplink shared channel (PUSCH) on the TDD CC based on the identified xTTI length configuration;
signal for transmission of a HARQ acknowledgement (HARQ-ACK) to an evolved NodeB (eNB) based at least on a HARQ-ACK timeline and based on the identified xTTI length configuration;
determine a self-contained HARQ-ACK window in xTTI, the self-contained window comprising a downlink transmission burst period, a guard period (GP), and an uplink transmission period;
signal for transmission of HARQ-ACK bits for PDSCH in the downlink transmission burst period, the GP, or the uplink transmission period of the HARQ-ACK window; and
configure the self-contained window based on at least a time division duplex (TDD) uplink/downlink (UL/DL) configuration broadcasted by higher layers, wherein the xTTI length is configured by higher layers or indicated by a downlink control information (DCI) format.

17. The apparatus of claim 16, wherein:
a DL transmission period comprises a duration reserved for downlink transmission between two consecutive uplink pilot time slots (UpPTS);
the GP is signaled based on the UL/DL configuration; and
an UL transmission period comprises a duration reserved for UL transmission between two consecutive downlink pilot time slots (DwPTS).

18. A non-transitory machine-readable medium comprising instructions that, when executed by one or more processors of a user equipment (UE), causes the one or more processors to:
decode downlink control information that signals a shortened transmission time interval (xTTI) length configuration for a time division duplexing (TDD) component carrier (CC), the xTTI length configuration comprising a length in time or a length in orthogonal frequency division multiplexing (OFDM) symbols;
decode a physical downlink control channel (PDCCH) to identify scheduling timing and hybrid automatic repeat request (HARQ) timing of physical downlink shared channel (PDSCH) and physical uplink shared channel (PUSCH) on the TDD CC based on the identified xTTI length configuration, the PDCCH scheduling a PDSCH in a single xTTI; and encode a HARQ acknowledgement (HARQ-ACK) for transmission to an evolved NodeB (eNB) based at least on the identified xTTI length configuration, the HARQ-ACK for the PDSCH being encoded for transmission in a next uplink xTTI, wherein prior to receipt of the downlink control information signalling the xTTI length configuration, the UE was configured to use a legacy TTI length configuration, the xTTI length configuration being half the legacy TTI length configuration.

* * * * *